(12) United States Patent
Brantley et al.

(10) Patent No.: US 7,943,263 B2
(45) Date of Patent: May 17, 2011

(54) HEAT EFFICIENT PORTABLE FUEL CELL SYSTEMS

(75) Inventors: Jennifer E. Brantley, Dublin, CA (US); Ian W. Kaye, Livermore, CA (US); Michael C. DeRenzi, San Ramon, CA (US); William Di Scipio, Fremont, CA (US)

(73) Assignee: UltraCell Corporation, Livermore, CA (US)

( * ) Notice: Subject to any disclaimer, the term of this patent is extended or adjusted under 35 U.S.C. 154(b) by 959 days.

(21) Appl. No.: 11/830,274

(22) Filed: Jul. 30, 2007

(65) Prior Publication Data

US 2007/0292729 A1 Dec. 20, 2007

Related U.S. Application Data

(63) Continuation of application No. 11/314,810, filed on Dec. 20, 2005, now Pat. No. 7,666,539, which is a continuation-in-part of application No. 10/877,771, filed on Jun. 25, 2004, now Pat. No. 7,763,368.

(60) Provisional application No. 60/638,421, filed on Dec. 21, 2004, provisional application No. 60/482,996, filed on Jun. 27, 2003, provisional application No. 60/483,416, filed on Jun. 27, 2003, provisional application No. 60/482,981, filed on Jun. 27, 2003.

(51) Int. Cl.
*H01M 8/04* (2006.01)
(52) U.S. Cl. ......... 429/436; 429/441; 429/433; 429/434
(58) Field of Classification Search ............. 429/433, 429/434, 436, 441
See application file for complete search history.

(56) References Cited

U.S. PATENT DOCUMENTS

| | | | |
|---|---|---|---|
| 3,973,993 | A | 8/1976 | Bloomfield et al. |
| 4,128,700 | A | 12/1978 | Sederquist |
| 4,737,161 | A | 4/1988 | Szydlowski et al. |
| 4,965,143 | A | 10/1990 | Mizuno et al. |
| 5,081,095 | A | 1/1992 | Bedford et al. |
| 5,434,015 | A | 7/1995 | Yamada et al. |

(Continued)

FOREIGN PATENT DOCUMENTS

DE 19841993 3/2000

(Continued)

OTHER PUBLICATIONS

S. Ahmed et al., "Catalytic Partial Oxidation Reforming of Hydrocarbon Fuels", Nov. 16-19, 1998, 1998 Fuel Cell Seminar, Palm Springs, CA.

(Continued)

*Primary Examiner* — Helen O Conley
(74) *Attorney, Agent, or Firm* — Beyer Law Group LLP

(57) ABSTRACT

The invention relates to fuel cell systems with improved thermal efficiency. The systems include a fuel cell that generates electrical energy using hydrogen and a fuel processor that produces hydrogen from a fuel. Some heat efficient systems described herein include a thermal catalyst that generates heat when the catalyst interacts with a heating medium. The heat is used to heat the fuel cell. The thermal catalyst may be disposed in proximity to the fuel cell, or remote from the fuel cell and a heat transfer pipe conducts heat from the catalyst to the fuel cell. Another thermally efficient embodiment uses a recuperator to transfer heat generated in the fuel cell system to incoming fuel. A fuel cell package may also include a multi-layer insulation arrangement to decrease heat loss from the fuel cell and fuel processor, which both typically operate at elevated temperatures.

20 Claims, 16 Drawing Sheets

U.S. PATENT DOCUMENTS

| | | | |
|---|---|---|---|
| 5,525,436 | A | 6/1996 | Savinell et al. |
| 5,534,328 | A | 7/1996 | Ashmead et al. |
| 5,601,938 | A | 2/1997 | Mayer et al. |
| 5,611,214 | A | 3/1997 | Wegeng et al. |
| 5,641,585 | A | 6/1997 | Lessing et al. |
| 5,716,727 | A | 2/1998 | Savinell et al. |
| 5,789,093 | A | 8/1998 | Malhi |
| 5,811,062 | A | 9/1998 | Wegeng et al. |
| 5,961,930 | A | 10/1999 | Chatterjee et al. |
| 5,961,932 | A | 10/1999 | Ghosh et al. |
| 6,077,620 | A | 6/2000 | Pettit |
| 6,080,501 | A | 6/2000 | Kelley et al. |
| 6,103,411 | A | 8/2000 | Matsubayashi et al. |
| 6,193,501 | B1 | 2/2001 | Masel et al. |
| 6,200,536 | B1 | 3/2001 | Tonkovich et al. |
| 6,235,983 | B1 | 5/2001 | Becker |
| 6,245,214 | B1 | 6/2001 | Rehg et al. |
| 6,268,077 | B1 | 7/2001 | Kelley et al. |
| 6,312,846 | B1 | 11/2001 | Marsh |
| 6,406,808 | B1 | 6/2002 | Pratt et al. |
| 6,415,860 | B1 | 7/2002 | Kelly et al. |
| 6,423,434 | B1 | 7/2002 | Pratt et al. |
| 6,460,733 | B2 | 10/2002 | Acker et al. |
| 6,465,119 | B1 | 10/2002 | Koripella et al. |
| 6,470,569 | B1 | 10/2002 | Lippert et al. |
| 6,537,506 | B1 | 3/2003 | Schwalbe et al. |
| 6,541,676 | B1 | 4/2003 | Franz et al. |
| 6,569,550 | B2 | 5/2003 | Khelifa |
| 6,569,553 | B1 | 5/2003 | Koripella et al. |
| 6,638,654 | B2 | 10/2003 | Jankowski et al. |
| 6,673,130 | B2 | 1/2004 | Jankowski et al. |
| 6,753,036 | B2 | 6/2004 | Jankowski et al. |
| 6,821,666 | B2 | 11/2004 | Morse et al. |
| 6,866,951 | B2 | 3/2005 | Foley et al. |
| 6,913,998 | B2 | 7/2005 | Jankowski |
| 6,921,603 | B2 | 7/2005 | Morse |
| 6,939,632 | B2 | 9/2005 | Arana et al. |
| 6,960,235 | B2 | 11/2005 | Morse |
| 6,960,403 | B2 | 11/2005 | Morse |
| 6,977,002 | B2 | 12/2005 | Takimoto et al. |
| 7,122,261 | B2 | 10/2006 | Morse |
| 7,186,352 | B2 | 3/2007 | Morse |
| 7,189,471 | B2 | 3/2007 | Jankowksi |
| 2001/0016275 | A1 | 8/2001 | Takamura |
| 2001/0028968 | A1 | 10/2001 | Griesneier |
| 2001/0029974 | A1 | 10/2001 | Cohen et al. |
| 2002/0012825 | A1 | 1/2002 | Sasahara et al. |
| 2002/0028366 | A1 | 3/2002 | Haltiner |
| 2002/0045082 | A1 | 4/2002 | Marsh |
| 2002/0068203 | A1 | 6/2002 | Hiyoshi et al. |
| 2002/0071972 | A1 | 6/2002 | Gebhardt et al. |
| 2002/0076599 | A1 | 6/2002 | Neutzler et al. |
| 2002/0081468 | A1 | 6/2002 | Shioya |
| 2002/0094462 | A1 | 7/2002 | Shioya et al. |
| 2002/0098119 | A1 | 7/2002 | Goodman |
| 2002/0102451 | A1 | 8/2002 | Acker et al. |
| 2002/0106540 | A1 | 8/2002 | Shioya |
| 2002/0127141 | A1 | 9/2002 | Acker |
| 2002/0131915 | A1 | 9/2002 | Shore et al. |
| 2002/0132156 | A1 | 9/2002 | Ruhl et al. |
| 2002/0147107 | A1 | 10/2002 | Abdo et al. |
| 2002/0150804 | A1 | 10/2002 | Srinivasan et al. |
| 2002/0155335 | A1 | 10/2002 | Kearl |
| 2002/0192537 | A1 | 12/2002 | Ren |
| 2003/0006668 | A1 | 1/2003 | Lal et al. |
| 2003/0027022 | A1 | 2/2003 | Arana et al. |
| 2003/0031910 | A1 | 2/2003 | Satou et al. |
| 2003/0031913 | A1 | 2/2003 | Pavio et al. |
| 2003/0057199 | A1 | 3/2003 | Villa et al. |
| 2003/0082423 | A1 | 5/2003 | Kushibiki et al. |
| 2003/0091502 | A1 | 5/2003 | Holladay et al. |
| 2003/0129464 | A1 | 7/2003 | Becerra et al. |
| 2003/0138681 | A1 | 7/2003 | Boneberg et al. |
| 2003/0194363 | A1 | 10/2003 | Koripella |
| 2003/0198844 | A1 | 10/2003 | Ukai et al. |
| 2003/0235732 | A1 | 12/2003 | Haltiner, Jr. |
| 2004/0009381 | A1 | 1/2004 | Sakai et al. |
| 2004/0048128 | A1 | 3/2004 | Jankowski |
| 2004/0062961 | A1 | 4/2004 | Sato et al. |
| 2004/0076861 | A1 | 4/2004 | Mann et al. |
| 2004/0166395 | A1 | 8/2004 | Jankowski |
| 2005/0008909 | A1 | 1/2005 | Kaye |
| 2005/0008911 | A1 | 1/2005 | Kaye |
| 2005/0011125 | A1 | 1/2005 | Kaye |
| 2005/0014040 | A1 | 1/2005 | Kaye |
| 2005/0014059 | A1 | 1/2005 | Kaye |
| 2005/0186455 | A1 | 8/2005 | Kaye |
| 2005/0244685 | A1 | 11/2005 | Kim et al. |
| 2006/0024543 | A1 | 2/2006 | Kaye et al. |

FOREIGN PATENT DOCUMENTS

| | | |
|---|---|---|
| GB | 002405744 | 3/2005 |
| JP | 10-162842 | 6/2008 |
| WO | WO 00/45457 | 8/2000 |
| WO | WO 02/059993 | 8/2002 |
| WO | WO 02/093665 | 11/2002 |
| WO | WO 02/103832 | 12/2002 |
| WO | WO 02/103878 | 12/2002 |
| WO | WO 2004/030805 | 4/2004 |

OTHER PUBLICATIONS

A.R. Boccaccini et al., "Electrophoretic Deposition of Nanoceramic Particles onto Electrically Conducting Fibre Fabrics", Sep. 21-24, 1998, $43^{rd}$ International Scientific Colloquium, Technical University of Ilmenau.

J. Bostaph et al., "1W Direct Methanol Fuel Cell System as a Desktop Charger", Oct. 14, 2002, Motorola Labs, Tempe, AZ.

K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.

M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.

S. Ehrenberg et al., "One Piece Bi-Polar (OPB) Plate with Cold Plate Cooling", Dec. 13, 2002, Session PEM R&D II (2A), Dais Analytic-Rogers.

T.M. Floyd et al., "Liquid-Phase and Multi-Phase Microreactors for Chemical Synthesis", Jun. 1999, Massachusetts Institute of Technology, Cambridge, MA.

A.J. Franz et al., "High Temperature Gas Phase Catalytic and Membrane Reactors", Jun. 1999, Massachusetts Institute of Technology, Cambridge, MA.

J.D. Holladay et al., "Miniature Fuel Processors for Portable Fuel Cell Power Supplies", Nov. 26, 2002, Battelle Pacific Northwest Division, Richland, WA.

S.W. Janson et al., "MEMS, Microengineering and Aerospace Systems", 1999, The American Institute of Aeronautics and Astronautics, Inc.

J. Kaschmitter et al., "Micro-Fabricated Methanol/Water Reformers for Small PEM Fuel Cell Systems", Jul. 21-24, 2003, $8^{th}$ Electrochemical Power Sources R&D Symposium, Portsmouth, VA.

K. Keegan et al., "Analysis for a Planar Solid Oxide Fuel Cell Based Automotive Auxiliary Power Unit", Mar. 4-7, 2002, SAE 2002 World Congress, Detroit, MI.

K. Kempa et al., "Photonic Crystals Based on Periodic Arrays of Aligned Carbon Nanotubes", Oct. 3, 2002, Nano Letters 2003, vol. 3. No. 1, 13-18.

R. Kumar et al., "Solid Oxide Fuel Cell Research at Argonne National Laboratory", Mar. 29-30, 2001, $2^{nd}$ Solid Sate Energy Conversion Alliance Workshop, Arlington, VA.

S.H. Lee et al., "Removal of Carbon Monoxide from Reformate for Polymer Electrolyte Fuel Cell Application", Nov. 16-19, 1998, 1998 Fuel Cell Seminar, Palm Springs, CA.

Q. Li et al., "The CO Poisoning Effect in PEMFCs Operational at Temperatures up to 200° C", 2003, Journal of the Electrochemical Society, 150 (12) A1599-A1605.

D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.

D.R. Palo et al., "Development of a Soldier-Portable Fuel Cell Power System, Part I: A Bread-Board Methanol Fuel Processor", 2002, Journal of Power Sources 108 (2002) 28-34.

A. Pattekar et al., "A Microreactor for In-situ Hydrogen Production by Catalytic Methanol Reforming", May 27-30, 2001, Proceedings of the 5th International Conference on Microreaction Technology.

A. Pattekar et al., "Novel Microfluidic Interconnectors for High Temperature and Pressure Applications", 2003, Journal of Micromechanics and Microengineering, 13, 337-345.

D. Prater et al., "Systematic Examination of a Direct Methanol-Hydrogen Peroxide Fuel Cell", Sep. 22, 2001, Swift Enterprises, Ltd., Lafayette, IN.

W. Ruettinger et al., "A New Generation of Water Gas Shift Catalysts for Fuel Cell Applications", 2003, Journal of Power Sources, 118, 61-65.

O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.

R.F. Savinell et al., "High Temperature Polymer Electrolyte for PEM Fuel Cells", Sep. 4, 2002, Department of Chemical Engineering, Case Western Reserve University.

R. Srinivasan et al., "Micromachined Reactors for Catalytic Partial Oxidation Reactions", Nov. 1997, AIChe Journal, vol. 43, No. 11, 3059-3069.

S. Swartz et al., "Ceria-Based Water-Gas-Shift Catalysts", Aug. 1, 2003, NexTech Materials, Ltd., Wolrthington, OH.

S. Tasic et al., "Multilayer Ceramic Processing of Microreactor Systems", Oct. 14, 2002, Motorola Labs, Tempe, AZ.

V. Tomašić et al., "Development of the Structured Catalysts for the Exhaust Gas Treatment", 2001, Chem. Biochem. Eng. Q. 15 (3), 109-115.

Tiax LLC, "Advanced Hydrogen Storage: A System's Perspective and Some Thoughts on Fundamentals", Aug. 14-15, 2002, Presentation for DOE Workshop on Hydrogen Storage, Cambridge, MA.

Wan et al., "Catalyst Preparation: Catalytic Converter", Feb. 19, 2003, www.insightcentral.net/encatalytic.html.

J. Zalc et al., "Are Noble Metal-Based Water-Gas Shift Catalysts Practical for Automotive Fuel Processing?", 2002, Journal of Catalysis, 206, 169-171.

J. Zizelman et al., "Solid-Oxide Fuel Cell Auxiliary Power Unit: A Paradigm Shift in Electric Supply for Transportation", undated, Delphi Automotive Systems.

"Methanol-Powered Laptops—Cleared for Take-Off", www.silicon.com, Oct. 7, 2002.

Melissa Funk, "Methanol Fuel Quality Specification Study for Proton Exchange Membrane Fuel Cells, Final Report", XCELLSIS, Feb. 2002, 65 pages.

Dr. Detlef zur Megede et al., "MFCA Research Document, Complete", Methanol Fuel Cell Alliance, Sep. 2000, 242 pages.

International Search Report dated Apr. 8, 2005 for PCT Application No. PCT/US2004/020517.

Written Opinion dated Apr. 8, 2005 for PCT Application No. PCT/US2004/020517.

Shankara Narayanan K.R., "What is a Heat Pipe", http://www.cheresources.com/htpipes.shtml.

Office Action from U.S. Appl. No. 10/877,771 dated Mar. 10, 2005.
Office Action from U.S. Appl. No. 10/877,771 dated Aug. 24, 2005.
Office Action from U.S. Appl. No. 10/877,771 dated Feb. 23, 2006.
Office Action from U.S. Appl. No. 10/877,771 dated Jul. 3, 2006.
Office Action from U.S. Appl. No. 10/877,771 dated Oct. 11, 2006.
Office Action dated Nov. 6, 2007 in Chinese Patent Application No. 200480024524.9.
Office Action dated Sep. 28, 2007 received in Chinese Application No. 200480024524.9.
Office Action dated Feb. 24, 2008 in US Appl. No. 11/830,669.
Office Action dated Dec. 9, 2008 in U.S. Appl. No. 10/877,769.
Chinese Office Action dated Feb. 13, 2009 from CN Patent Application No. 200480024524.9.
Indian Examination Report dated Dec. 22, 2008 from in Patent Application No. 013/KOLNP/2005.
Office Action dated Mar. 24, 2009 in U.S. Appl. No. 11/314,810.
Office Action dated Feb. 5, 2009 in U.S. Appl. No. 11/829,932.
International Search Report dated Aug. 5, 2008 from PCT Application No. PCT/US07/17579.
Written Opinion dated Aug. 5, 2008 from PCT Application No. PCT/US07/17579.
Office Action dated Jun. 16, 2008 from U.S. Appl. No. 10/877,769.
Office Action dated Jun. 6, 2008 from U.S. Appl. No. 11/829,932.
International Search Report dated Apr. 2, 2008 from PCT Application No. PCT/US05/46423.
Written Opinion dated Apr. 2, 2008 from PCT Application No. PCT/US05/46423.
Office Action dated Aug. 5, 2008 from U.S. Appl. No. 11/830,669.
Chinese Office Action dated Jul. 18, 2008 from CN Patent Application No. 200480024524.9.
International Search Report dated Apr. 2, 2008 from PCT Application No. PCT/US05/46423.
Written Opinion dated Apr. 2, 2008 from PCT Application No. PCT/US05/46423.
Office Action dated Aug. 5, 2008 from U.S. Appl. No. 11/830,669.
Chinese Office Action dated Jul. 18, 2008 from CN Patent Application No. 200480024524.9.
Office Action dated Jun. 16, 2008 from U.S. Appl. No. 10/877,769.
International Search Report dated Aug. 5, 2008 from PCT Application No. PCT/US07/17579.
Written Opinion dated Aug. 5, 2008 from PCT Application No. PCT/US07/17579.
Office Action dated Jun. 6, 2008 from U.S. Appl. No. 11/829,932.
Chinese Office Action dated Jun. 20, 2008 from CN Patent Application No. 200480024523.4.

HEAT EFFICIENT PORTABLE FUEL CELL SYSTEMS

CROSS-REFERENCE TO RELATED APPLICATIONS

This application is a continuation of U.S. patent application Ser. No. 11/314,810, currenrly U.S. Pat. No. 7,666,539 filed Dec. 20, 2005 and entitled "Heat Efficient Portable Fuel Cell Systems", which a) claims priority under 35 U.S.C. §119(e) to U.S. Provisional Patent Application No. 60/638,421 filed on Dec. 21, 2004; and b) is a continuation-in-part of and claims priority under 35 U.S.C. §120 to U.S. patent application Ser. No. 10/877,771 currently U.S. Pat. No. 7,763,368 filed Jun. 25, 2004, which claims priority under 35 U.S.C. §119(e) from i) U.S. Provisional Patent Application No. 60/482,996 filed on Jun. 27, 2003, ii) U.S. Provisional Patent Application No. 60/483,416 and filed on Jun. 27, 2003, and iii) U.S. Provisional Patent Application No. 60/482,981 and filed on Jun. 27, 2003; each of the above mentioned patent applications is incorporated by reference in its entirety herein for all purposes.

BACKGROUND OF THE INVENTION

The present invention relates to fuel cell technology. In particular, the invention relates to systems and methods for improving the thermal efficiency of a fuel cell system.

A fuel cell electrochemically combines hydrogen and oxygen to produce electricity. The ambient air readily supplies oxygen; hydrogen provision, however, calls for a working supply. The hydrogen supply may include a direct hydrogen supply or a 'reformed' hydrogen supply. A direct hydrogen supply employs a pure source, such as compressed hydrogen in a pressurized container, or a solid-hydrogen storage system, such as a metal-based hydrogen storage device.

A reformed hydrogen supply processes a fuel (or fuel source) to produce hydrogen. The fuel acts as a hydrogen carrier, is manipulated to separate hydrogen, and may include a hydrocarbon fuel, hydrogen bearing fuel stream, or any other hydrogen fuel such as ammonia. Currently available hydrocarbon fuels include methanol, ethanol, gasoline, propane and natural gas. Liquid fuels offer high energy densities and the ability to be readily stored and transported.

Consumer electronics devices and other portable electrical power applications currently rely on lithium ion and other battery technologies. Portable fuel cell systems that generate electrical energy for portable applications such as electronics devices would be desirable but are not yet commercially available.

Thermal inefficiencies in a portable fuel cell system waste energy and undesirably require more fuel to be consumed and carried. Techniques that increase efficiency of a portable fuel cell system would be beneficial.

SUMMARY OF THE INVENTION

The present invention relates to fuel cell systems with improved thermal efficiency. The systems include a fuel cell that generates electrical energy using hydrogen and a fuel processor that produces hydrogen from a fuel. The fuel processor includes a reformer and a burner that heats the reformer.

In one embodiment, heat efficient systems described herein include a thermal catalyst, disposed outside the fuel cell, operable to produce heat when a heating medium interacts with the thermal catalyst. The heat is used to heat the fuel cell when the fuel cell is below a threshold temperature such as its minimum operating temperature. For example, the thermal catalyst may comprise a catalyst that generates heat in the presence of methanol, such as unused methanol in the burner exhaust. The thermal catalyst may be disposed in proximity to the fuel cell, such as in contact with one or more heat transfer appendages that permit external thermal management of internal portions of fuel cell stack. In another embodiment, the catalyst is remote from the fuel cell and a heat transfer pipe conducts heat from the catalyst to the fuel cell.

Another thermally efficient embodiment uses a recuperator to transfer heat generated in the fuel cell system to incoming fuel.

A fuel cell package may also include a multi-layer insulation arrangement to decrease heat loss from the fuel cell and fuel processor, which both typically operate at elevated temperatures. The insulation also increases thermal efficiency of the fuel cell system by keeping more heat internal to the package.

In one aspect, the present invention relates to a fuel cell system for producing electrical energy. The fuel cell system comprises a fuel processor that includes a) a reformer configured to receive reformer fuel and including a catalyst that facilitates the production of hydrogen from the reformer fuel, and b) a burner configured to catalytically process burner fuel to generate heat. The fuel cell system also comprises a fuel cell including a fuel cell stack that is configured to produce electrical energy using hydrogen output by the fuel processor, and including a heat transfer appendage that includes a portion arranged external to the fuel cell stack and is in conductive thermal communication with an internal portion of the fuel cell stack. The fuel cell system further includes a thermal catalyst disposed outside the fuel cell that produces heat when a heating medium interacts with the thermal catalyst. The fuel cell system additionally includes plumbing configured to transport the heating medium from the burner to the thermal catalyst.

In another aspect, the present invention relates to a fuel cell system that includes a fuel processor, fuel cell, a catalyst containment system, and fluidic plumbing. The catalyst containment system includes a set of walls that are configured to hold a thermal catalyst outside the fuel cell and permit a heating medium to pass into the catalyst containment system. The thermal catalyst and heating medium are selected to produce heat when the heating medium interacts with the thermal catalyst. The plumbing is configured to transport the heating medium to the catalyst containment system, wherein an outlet of the plumbing is less than about 2 centimeters from thermal catalyst nearest to the outlet.

In yet another aspect, the present invention relates to a fuel cell system that includes a fuel processor, fuel cell, thermal catalyst, heat transfer pipe and fluidic plumbing. The thermal catalyst is disposed outside the fuel cell and produces heat when a heating medium interacts with the thermal catalyst. The heat transfer pipe is configured to conductively transfer heat from the thermal catalyst to the fuel cell stack. The plumbing is configured to transport the heating medium from the burner to the thermal catalyst.

In still another aspect, the present invention relates to a method for providing a fuel to a fuel cell system including a fuel cell and a fuel processor. The method includes providing fuel to a burner in the fuel processor; and combusting the fuel in the burner to generate heat. The method also includes transferring at least a portion of the heat from the burner to a reformer included in the fuel processor. The method further includes increasing an amount of the fuel provided to the burner such that more fuel is provided to the burner than is used in the burner to generate heat. Exhaust is then provided from the burner to a thermal catalyst that produces heat when the burner exhaust interacts with the thermal catalyst. The method then includes transferring the heat from the thermal catalyst to the fuel cell.

In another aspect, the present invention relates to a fuel cell system that includes a fuel processor, fuel cell, and fuel preheating using heat generated in the system. The fuel cell system also includes plumbing configured to transport a reformer fuel to the reformer; and plumbing configured to transport a burner fuel to the burner. The fuel cell system further includes a recuperator that is configured to transfer heat generated in the fuel cell system to the reformer fuel or the burner fuel.

These and other features of the present invention will be described in the following description of the invention and associated figures.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Fuel Cell Systems

Figure 1A:
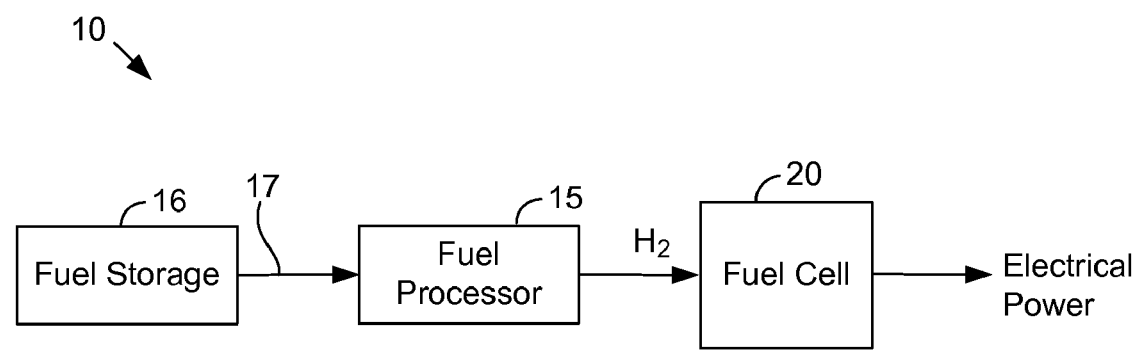
FIG. 1A illustrates a fuel cell package including a fuel processor in accordance with one embodiment of the present invention.

Fuel cell systems that benefit from the present invention will first be described. FIG. 1A illustrates an exemplary fuel cell system 10 for producing electrical energy in accordance with one embodiment of the present invention. The 'reformed' hydrogen system 10 processes a fuel 17 to produce hydrogen for supply to fuel cell 20. As shown, the reformed hydrogen supply includes a fuel processor 15 and a fuel storage device 16.

Storage device 16 (or 'cartridge') stores a fuel 17, and may comprise a refillable and/or disposable fuel cartridge. Either design permits recharging capability for a fuel cell system or electronics device by swapping a depleted cartridge for one with fuel. A connector on the cartridge 16 interfaces with a mating connector on an electronics device or portable fuel cell system to permit fuel to be withdrawn from the cartridge. In one embodiment, the cartridge includes a bladder that contains the fuel and conforms to the volume of fuel in the bladder. An outer rigid housing provides mechanical protection for the bladder. The bladder and housing permit a wide range of portable and non-portable cartridge sizes with fuel capacities ranging from a few milliliters to several liters. In one embodiment, the cartridge is vented and includes a small hole, single direction flow valve, hydrophobic filter, or other aperture to allow air to enter the fuel cartridge as fuel 17 is consumed and displaced from the cartridge. This type of cartridge allows for "orientation" independent operation since pressure in the bladder remains relatively constant as fuel is displaced. A pump may draw fuel 17 from the fuel storage device 16. Cartridges may also be pressurized with a pressure source such as foam or a propellant internal to the housing that pushes on the bladder (e.g, propane or compressed nitrogen gas). Other fuel cartridge designs suitable for use herein may include a wick that moves a liquid fuel from locations within a fuel cartridge to a cartridge exit. In another embodiment, the cartridge includes 'smarts', or a digital memory used to store information related to usage of the fuel cartridge.

A pressure source (FIG. 1B) moves the fuel 17 from cartridge 16 to fuel processor 15. Exemplary pressure sources include pumps, pressurized sources internal to the cartridge (such as a compressible foam or spring) that employ a control valve to regulate flow, etc. In one embodiment, a diaphragm pump controls fuel 17 flow from storage device 16. If system 10 is load following, then a control system meters fuel 17 flow to deliver fuel to processor 15 at a flow rate determined by a required power level output of fuel cell 20 and regulates a controlled item accordingly.

Fuel 17 acts as a carrier for hydrogen and can be processed or manipulated to separate hydrogen. As the terms are used herein, 'fuel', 'fuel source' and 'hydrogen fuel source' are interchangeable and all refer to any fluid (liquid or gas) that can be manipulated to separate hydrogen. Fuel 17 may include any hydrogen bearing fuel stream, hydrocarbon fuel or other source of hydrogen such as ammonia. Currently available hydrocarbon fuels 17 suitable for use with the present invention include gasoline, $C_1$ to $C_4$ hydrocarbons, their oxygenated analogues and/or their combinations, for example. Other fuel sources may be used with a fuel cell package of the present invention, such as sodium borohydride. Several hydrocarbon and ammonia products may also be used. Liquid fuels 17 offer high energy densities and the ability to be readily stored and shipped.

Fuel 17 may be stored as a fuel mixture. When the fuel processor 15 comprises a steam reformer, for example, storage device 16 includes a fuel mixture of a hydrocarbon fuel and water. Hydrocarbon fuel/water mixtures are frequently represented as a percentage of fuel in water. In one embodiment, fuel 17 comprises methanol or ethanol concentrations in water in the range of 1-99.9%. Other liquid fuels such as butane, propane, gasoline, military grade "JP8", etc. may also be contained in storage device 16 with concentrations in water from 5-100%. In a specific embodiment, fuel 17 comprises 67% methanol by volume.

Fuel processor 15 processes fuel 17 and outputs hydrogen. In one embodiment, a hydrocarbon fuel processor 15 heats and processes a hydrocarbon fuel 17 in the presence of a catalyst to produce hydrogen. Fuel processor 15 comprises a reformer, which is a catalytic device that converts a liquid or gaseous hydrocarbon fuel 17 into hydrogen and carbon dioxide. As the term is used herein, reforming refers to the process of producing hydrogen from a fuel 17. Fuel processor 15 may output either pure hydrogen or a hydrogen bearing gas stream (also commonly referred to as 'reformate').

Various types of reformers are suitable for use in fuel cell system 10; these include steam reformers, auto thermal reformers (ATR) and catalytic partial oxidizers (CPOX) for example. A steam reformer only needs steam and fuel to produce hydrogen. ATR and CPOX reformers mix air with a fuel/steam mixture. ATR and CPOX systems reform fuels such as methanol, diesel, regular unleaded gasoline and other hydrocarbons. In a specific embodiment, storage device 16 provides methanol 17 to fuel processor 15, which reforms the methanol at about 280° C. or less and allows fuel cell system 10 usage in low temperature applications.

Fuel cell 20 electrochemically converts hydrogen and oxygen to water, generating electrical energy (and sometimes heat) in the process. Ambient air readily supplies oxygen. A pure or direct oxygen source may also be used. The water often forms as a vapor, depending on the temperature of fuel cell 20. For some fuel cells, the electrochemical reaction may also produce carbon dioxide as a byproduct.

In one embodiment, fuel cell 20 is a low volume ion conductive membrane (PEM) fuel cell suitable for use with portable applications such as consumer electronics. A PEM fuel cell comprises a membrane electrode assembly (MEA) that carries out the electrical energy generating an electrochemical reaction. The MEA includes a hydrogen catalyst, an oxygen catalyst, and an ion conductive membrane that a) selectively conducts protons and b) electrically isolates the hydrogen catalyst from the oxygen catalyst. A hydrogen gas distribution layer may also be included; it contains the hydrogen catalyst and allows the diffusion of hydrogen therethrough. An oxygen gas distribution layer contains the oxygen catalyst and allows the diffusion of oxygen and hydrogen protons therethrough. Typically, the ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

In one embodiment, a PEM fuel cell includes a fuel cell stack having a set of bi-polar plates. In one embodiment, each bi-polar plate is formed from a single sheet of metal that includes channel fields on opposite surfaces of the metal sheet. Thickness for these plates is typically below about 5 millimeters, and compact fuel cells for portable applications may employ plates thinner than about 2 millimeters. The single bi-polar plate thus dually distributes hydrogen and oxygen: one channel field distributes hydrogen while a channel field on the opposite surface distributes oxygen. In another embodiment, each bi-polar plate is formed from multiple layers that include more than one sheet of metal.

Multiple bi-polar plates can be stacked to produce the 'fuel cell stack' in which a membrane electrode assembly is disposed between each pair of adjacent bi-polar plates. Gaseous hydrogen distribution to the hydrogen gas distribution layer in the MEA occurs via a channel field on one plate while oxygen distribution to the oxygen gas distribution layer in the MES occurs via a channel field on a second plate on the other surface of the membrane electrode assembly.

In electrical terms, the anode includes the hydrogen gas distribution layer, hydrogen catalyst and a bi-polar plate. The anode acts as the negative electrode for fuel cell 20 and conducts electrons that are freed from hydrogen molecules so that they can be used externally, e.g., to power an external circuit or stored in a battery. In electrical terms, the cathode includes the oxygen gas distribution layer, oxygen catalyst and an adjacent bi-polar plate. The cathode represents the positive electrode for fuel cell 20 and conducts the electrons back from the external electrical circuit to the oxygen catalyst, where they can recombine with hydrogen ions and oxygen to form water.

In a fuel cell stack, the assembled bi-polar plates are connected in series to add electrical potential gained in each layer of the stack. The term 'bi-polar' refers electrically to a bi-polar plate (whether mechanically comprised of one plate or two plates) sandwiched between two membrane electrode assembly layers. In a stack where plates are connected in series, a bi-polar plate acts as both a negative terminal for one adjacent (e.g., above) membrane electrode assembly and a positive terminal for a second adjacent (e.g., below) membrane electrode assembly arranged on the opposite surface of the bi-polar plate.

In a PEM fuel cell, the hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder thinly coated onto a carbon paper or cloth. Many designs employ a rough and porous catalyst to increase surface area of the platinum exposed to the hydrogen and oxygen.

Since the electrical generation process in fuel cell 20 is exothermic, fuel cell 20 may implement a thermal management system to dissipate heat. Fuel cell 20 may also employ a number of humidification plates (HP) to manage moisture levels in the fuel cell.

While the present invention will mainly be discussed with respect to PEM fuel cells, it is understood that the present invention may be practiced with other fuel cell architectures. The main difference between fuel cell architectures is the type of ion conductive membrane used. In another embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may be applicable to the fuel processors described herein that output hydrogen for a fuel cell. Other such fuel cell architectures include alkaline and molten carbonate fuel cells, for example.

Figure 1B:
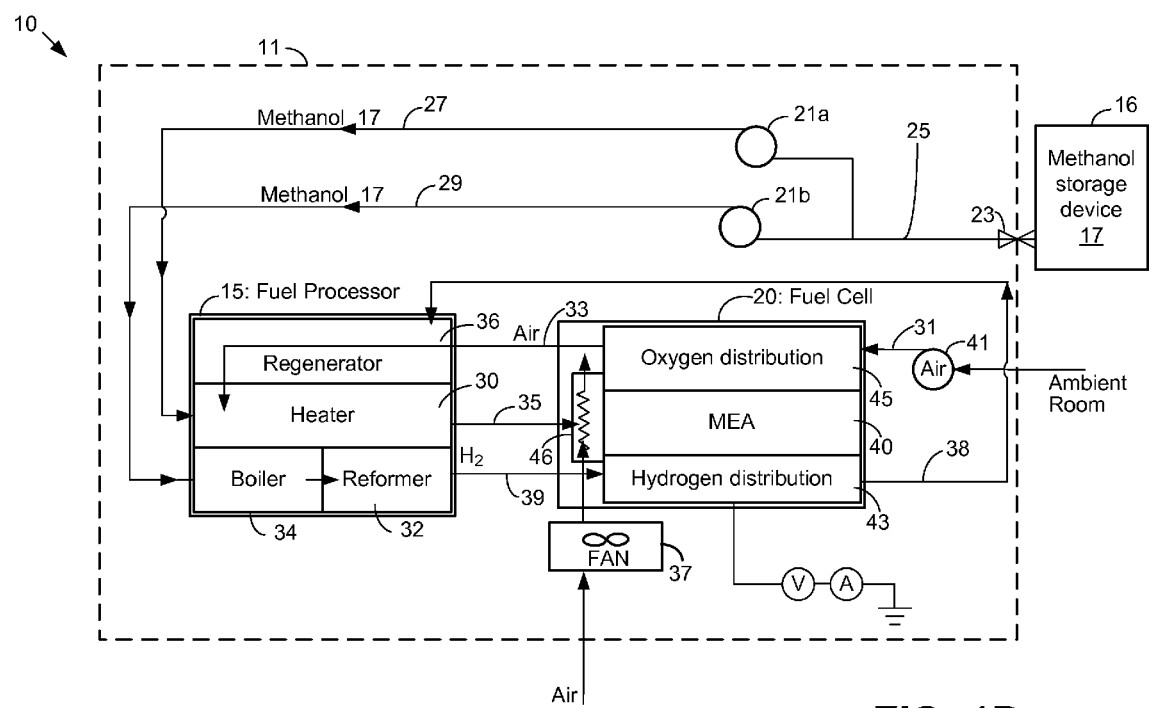
FIG. 1B illustrates schematic operation for the fuel cell package of FIG. 1A in accordance with a specific embodiment of the present invention.

FIG. 1B illustrates schematic operation for the fuel cell system 10 of FIG. 1A in accordance with a specific embodiment of the present invention.

Fuel storage device 16 stores methanol or a methanol mixture as a hydrogen fuel 17. An outlet of storage device 16 includes a connector 23 that mates with a mating connector on a package 11. In this case, the package 11 includes the fuel cell 20, fuel processor 15, and all other balance-of-plant components except the cartridge 16. In a specific embodiment, the connector 23 and mating connector form a quick connect/disconnect for easy replacement of cartridges 16. The mating connector communicates methanol 17 into hydrogen fuel line 25, which is internal to package 11 in this case.

Line 25 divides into two lines: a first line 27 that transports methanol 17 to a heater/heater 30 for fuel processor 15 and a second line 29 that transports methanol 17 for a reformer 32 in fuel processor 15. Lines 25, 27 and 29 may comprise channels disposed in the fuel processor (e.g., channels in metals components) and/or tubes leading thereto.

Flow control is provided on each line 27 and 29. Separate pumps 21a and 21b are provided for lines 27 and 29, respectively, to pressurize each line separately and transfer methanol at independent rates, if desired. A model 030SP-S6112 pump as provided by Biochem, NJ is suitable to transmit liquid methanol on either line in a specific embodiment. A diaphragm or piezoelectric pump is also suitable for use with system 10. A flow restriction may also provided on each line 27 and 29 to facilitate sensor feedback and flow rate control. In conjunction with suitable control, such as digital control applied by a processor that implements instructions from stored software, each pump 21 responds to control signals from the processor and moves a desired amount of methanol 17 from storage device 16 to heater 30 and reformer 32 on each line 27 and 29. In another specific embodiment shown, line 29 runs inlet methanol 17 across or through a heat exchanger (FIGS. 10A-10C) that receives heat from the exhaust of the heater 30 in fuel processor 15. This increases thermal efficiency for system 10 by preheating the incoming fuel (to reduce heating of the fuel in heater 30) and recuperates heat that would otherwise be expended from the system.

Air source 41 delivers oxygen and air from the ambient room through line 31 to the cathode in fuel cell 20, where some oxygen is used in the cathode to generate electricity. Air source 41 may include a pump, fan, blower or compressor, for example. High operating temperatures in fuel cell 20 also heat the oxygen and air.

In the embodiment shown, the heated oxygen and air is then transmitted from the fuel cell via line 33 to a regenerator 36 (also referred to herein as a 'dewar') of fuel processor 15, where the air is additionally heated (by the heater, while in the dewar) before entering heater 30. This double pre-heating increases efficiency of the fuel cell system 10 by a) reducing heat lost to reactants in heater 30 (such as fresh oxygen that would otherwise be near room temperature when combusted in the heater), and b) cooling the fuel cell during energy production. In this embodiment, a model BTC compressor as provided by Hargraves, N.C. is suitable to pressurize oxygen and air for fuel cell system 10.

A fan 37 blows cooling air (e.g., from the ambient room) over fuel cell 20. Fan 37 may be suitably sized to move air as desired by heating requirements of the fuel cell; and many vendors known to those of skill in the art provide fans suitable for use with package 10.

Fuel processor 15 receives methanol 17 and outputs hydrogen. Fuel processor 15 comprises heater 30, reformer 32, boiler 34 and regenerator 36. Heater 30 (also referred to herein as a burner when it uses catalytic combustion to generate heat) includes an inlet that receives methanol 17 from line 27. In a specific embodiment, the burner includes a catalyst that helps generate heat from methanol. In another embodiment, heater 30 also includes its own boiler to preheat fuel for the heater.

Boiler 34 includes a boiler chamber having an inlet that receives methanol 17 from line 29. The boiler chamber is configured to receive heat from heater 30, via heat conduction through walls in monolithic structure 100 between the boiler 34 and heater 30, and use the heat to boil the methanol passing through the boiler chamber. The structure of boiler 34 permits heat produced in heater 30 to heat methanol 17 in boiler 34 before reformer 32 receives the methanol 17. In a specific embodiment, the boiler chamber is sized to boil methanol before receipt by reformer 32. Boiler 34 includes an outlet that provides heated methanol 17 to reformer 32.

Reformer 32 includes an inlet that receives heated methanol 17 from boiler 34. A catalyst in reformer 32 reacts with the methanol 17 to produce hydrogen and carbon dioxide; this reaction is endothermic and draws heat from heater 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium that is preferential to carbon monoxide over hydrogen.

Regenerator 36 pre-heats incoming air before the air enters heater 30. In one sense, regenerator 36 uses outward traveling waste heat in fuel processor 15 to increase thermal management and thermal efficiency of the fuel processor. Specifically, waste heat from heater 30 pre-heats incoming air provided to heater 30 to reduce heat transfer to the air within the heater. As a result, more heat transfers from the heater to reformer 32. The regenerator also functions as insulation for the fuel processor. More specifically, by reducing the overall amount of heat loss from the fuel processor, regenerator 36 also reduces heat loss from package 10 by heating air before the heat escapes fuel processor 15. This reduces heat loss from fuel processor 15, which enables cooler fuel cell system 10 packages.

Line 39 transports hydrogen (or 'reformate') from fuel processor 15 to fuel cell 20. In a specific embodiment, gaseous delivery lines 33, 35 and 39 include channels in a metal interconnect that couples to both fuel processor 15 and fuel cell 20. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, fuel processor 15 regulates hydrogen gas provision to fuel cell 20.

Fuel cell 20 includes a hydrogen inlet port that receives hydrogen from line 39 and includes a hydrogen intake manifold that delivers the gas to one or more bi-polar plates and their hydrogen distribution channels. An oxygen inlet port of fuel cell 20 receives oxygen from line 31; an oxygen intake manifold receives the oxygen from the port and delivers the oxygen to one or more bi-polar plates and their oxygen distribution channels. A cathode exhaust manifold collects gases from the oxygen distribution channels and delivers them to a cathode exhaust port and line 33, or to the ambient room. An anode exhaust manifold 38 collects gases from the hydrogen distribution channels, and in one embodiment, delivers the gases to the ambient room.

In the embodiment shown, the anode exhaust is transferred back to fuel processor 15. In this case, system 10 comprises plumbing 38 that transports unused hydrogen from the anode exhaust to heater 30. For system 10, heater 30 includes two inlets: an inlet configured to receive fuel 17 and an inlet configured to receive hydrogen from line 38. In one embodiment, gaseous delivery in line 38 back to fuel processor 15 relies on pressure at the exhaust of the anode gas distribution channels, e.g., in the anode exhaust manifold. In another embodiment, an anode recycling pump or fan is added to line 38 to pressurize the line and return unused hydrogen back to fuel processor 15.

In one embodiment, fuel cell 20 includes one or more heat transfer appendages 46 that permit conductive heat transfer with internal portions of a fuel cell stack. In a specific heating embodiment as shown, exhaust of heater 30 in fuel processor 15 is transported to the one or more heat transfer appendages 46 in fuel cell 20 during system start-up to expedite reaching initial elevated operating temperatures in the fuel cell 20. The heat may come from hot exhaust gases or unburned fuel in the exhaust, which then interacts with a catalyst disposed in proximity to a heat transfer appendage 46. In a specific cooling embodiment, an additional fan 37 blows cooling air over the one or more heat transfer appendages 46, which provides dedicated and controllable cooling of the stack during electrical energy production.

In addition to the components shown in shown in FIG. 1B, system 10 may also include other elements such as electronic controls, additional pumps and valves, added system sensors, manifolds, heat exchangers and electrical interconnects useful for carrying out functionality of a fuel cell system 10 that are known to one of skill in the art and omitted for sake of brevity. FIG. 1B shows one specific plumbing arrangement for a fuel cell system; other plumbing arrangements are suitable for use herein. For example, the heat transfer appendages 46, a heat exchanger and dewar 36 need not be included. Other alterations to system 10 are permissible, as one of skill in the art will appreciate.

Fuel processors of the present invention are well suited for use with micro fuel cell systems. A micro fuel cell system generates dc voltage, and may be used in a wide variety of applications. For example, electrical energy generated by a micro fuel cell may power a notebook computer 11 or a portable electrical generator 11 carried by military personnel. In one embodiment, the present invention provides 'small' fuel cells that are configured to output less than 200 watts of power (net or total). Fuel cells of this size are commonly referred to as 'micro fuel cells' and are well suited for use with portable electronics devices. In one embodiment, the fuel cell is configured to generate from about 1 milliwatt to about 200 Watts. In another embodiment, the fuel cell generates from about 5 Watts to about 60 Watts. Fuel cell system 10 may be a stand-alone system, which is a single package 11 that produces power as long as it has access to a) oxygen and b) hydrogen or a hydrogen source such as a hydrocarbon fuel. One specific portable fuel cell package produces about 20 Watts or about 45 Watts, depending on the number of cells in the stack.

Exemplary Fuel Processor

Figure 2A:
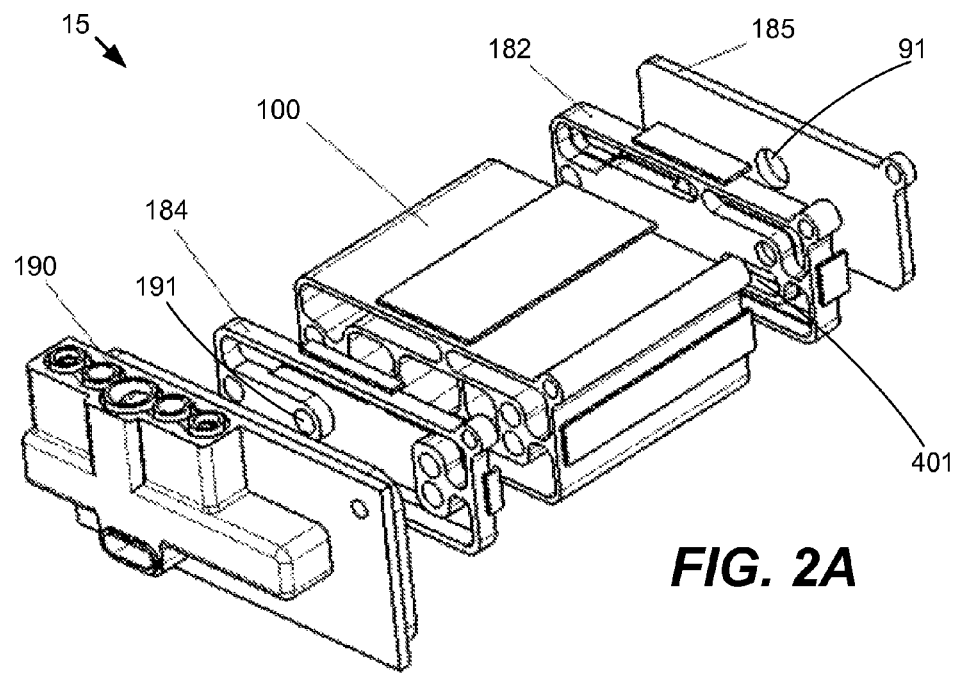
FIG. 2A illustrates a top perspective view of components included in an exemplary fuel processor in accordance with a specific embodiment of the present invention.
Figure 2B:
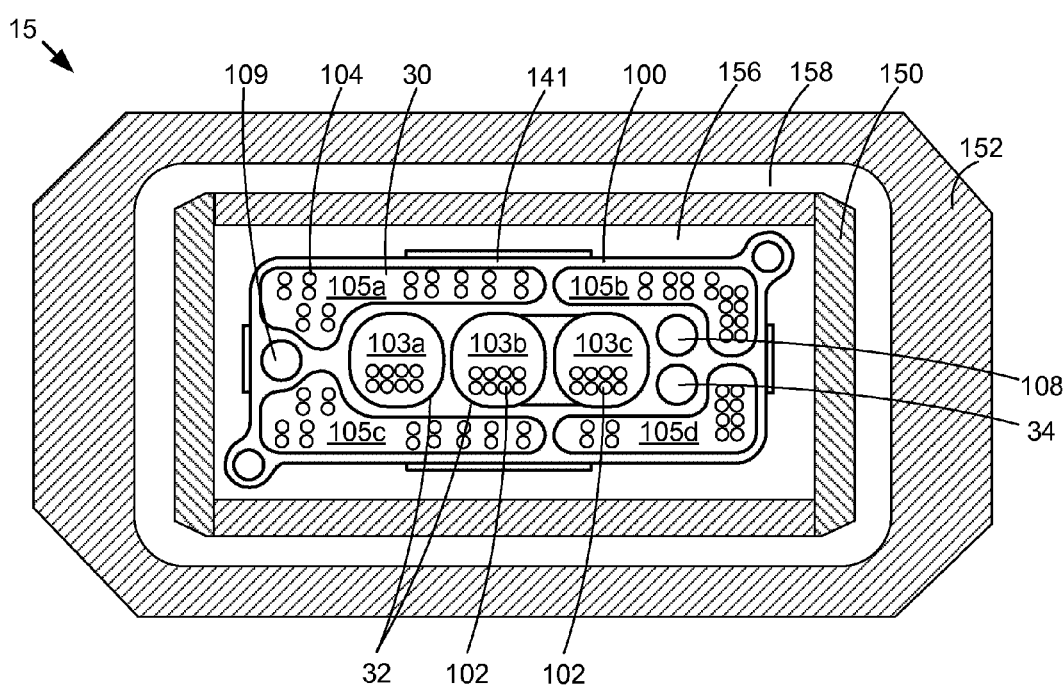
FIG. 2B illustrates a cross-sectional front view of a central portion of fuel processor of FIG. 2A.

FIG. 2A illustrates a top perspective view of components included in an exemplary fuel processor 15 in accordance with a specific embodiment of the present invention. FIG. 2B illustrates a cross-sectional front view of a central portion of fuel processor 15. Fuel processor 15 reforms methanol to produce hydrogen. Fuel processor 15 includes monolithic structure 100, end plates 182 and 184, end plate 185, reformer 32, heater 30, boiler 34, boiler 108, dewar 150 and housing 152. Although the present invention will now be described with respect to methanol consumption for hydrogen production, it is understood that fuel processors of the present invention may consume another fuel, such as one of the fuels listed above.

Referring initially to FIG. 2B, monolithic structure 100 includes reformer 32, heater 30, boiler 34 and boiler 108. As the term is used herein, 'monolithic' refers to a single and integrated structure. The structure may include one or more materials that permit conductive heat transfer within the fuel processor. Monolithic structure 100 comprises a single material 141, where cavities and space in the material 141 form reformer 32, heater 30, boiler 34 and boiler 108. The monolithic structure 100 and common material 141 simplify manufacture of fuel processor 15. For example, using a metal for common material 141 allows monolithic structure 100 to be formed by extrusion to shape reformer 32, heater 30, boiler 34 and boiler 108. In a specific embodiment, monolithic structure 100 is consistent in cross sectional dimensions between end plates 182 and 184 and solely comprises copper or another metal that has been formed in a single extrusion.

Outside monolithic structure 100, fuel processor 15 includes plumbing inlets and outlets for reformer 32, heater 30 and boiler 34 disposed on end plates 182 and 184 and interconnect 190, which will be described in further detail below.

Housing 152 (FIG. 3B) provides mechanical protection for internal components of fuel processor 15 such as monolithic structure 100. Housing 152 also provides separation from the environment external to processor 15 and may include inlet and outlet ports for gaseous and liquid communication in and out of fuel processor 15. In this case, housing 152 includes a set of walls that at least partially contain a dewar 150. The housing walls may include a suitably stiff material such as a metal or a rigid polymer, for example.

Boiler 34 pre-heats methanol for reformer 32. Boiler 34 receives methanol via a fuel inlet on interconnect 190, which couples to a methanol supply line 27 (FIG. 1B). Since methanol reforming and hydrogen production via a catalyst 102 in reformer 32 often requires elevated methanol temperatures, fuel processor 15 pre-heats the methanol before receipt by reformer 32 via boiler 34. As shown in the cross section of FIG. 2B, boiler 34 is disposed in proximity to heater 30 to receive heat generated in heater 30. The heat transfers via conduction through material 141 in monolithic structure 100 from heater 30 to boiler 34 and via convection from boiler 34 walls to the methanol passing therethrough. In one embodiment, boiler 34 is configured to vaporize liquid methanol. Boiler 34 then passes the gaseous methanol to reformer 32 for gaseous interaction with catalyst 102.

Reformer 32 is configured to receive methanol from boiler 34. Internal walls in monolithic structure 100 and end walls on end plates 182 and 184 define dimensions for one or more reformer chambers 103. In one embodiment, end plate 182 and/or end plate 184 includes a channel that routes heated methanol exhausted from boiler 34 into reformer 32.

In one embodiment, a reformer includes a multi-pass arrangement that has multiple reformer chambers 103. As shown in FIGS. 2A and 2B, reformer 32 includes three multi-pass chambers that process methanol in series. Reformer 32 then includes the volume of all three chambers 103*a-c*. Each chamber traverses the length of monolithic structure 100, and opens to each other in series such that chambers 103a-c form one contiguous path for gaseous flow. More specifically, heated and gaseous methanol from boiler 34 a) enters reformer chamber 103a at an inlet end of monolithic structure 100 and flows to the other end of structure 100 and over catalyst 102 in chamber 103a, b) then flows into second reformer chamber 103b at the second end of monolithic structure 100 and flows over catalyst 102 in chamber 103b from one end of monolithic structure 100 to the other, and c) flows into reformer chamber 103c at one end of monolithic structure 100 and flows to the other end over catalyst 102 in chamber 103c.

Reformer 32 includes a catalyst 102 that facilitates the production of hydrogen. Catalyst 102 reacts with methanol and produces hydrogen gas and carbon dioxide. In one embodiment, catalyst 102 comprises pellets packed to form a porous bed or otherwise suitably filled into the volume of reformer chambers 103. Pellet diameters ranging from about 50 microns to about 1.5 millimeters are suitable for many applications. Pellet diameters ranging from about 500 microns to about 1 millimeter are suitable for use with reformer 32. One suitable catalyst 102 may include CuZn coated onto alumina pellets when methanol is used as a hydrocarbon fuel 17. Other materials suitable for catalyst 102 include platinum, palladium, a platinum/ palladium mix, nickel, and other precious metal catalysts for example. Catalyst 102 pellets are commercially available from a number of vendors known to those of skill in the art. Catalyst 102 may also comprise catalyst materials listed above coated onto a metal sponge or metal foam. A wash coat of the desired metal catalyst material onto the walls of reformer chamber 103 may also be used with reformer 32.

Reformer 32 is configured to output hydrogen and includes an outlet port 191 (FIG. 2A) that communicates hydrogen produced in reformer 32 outside of fuel processor 15. Port 191 is disposed on a wall of end plate 184 and includes a hole that passes through the wall. Port 191 opens to hydrogen line in interconnect 190, which then forms part of a hydrogen provision line 39 (FIG. 1B) for transfer of the hydrogen to fuel cell 20 for electrical energy generation.

Hydrogen production in reformer 32 is slightly endothermic and draws heat from heater/heater 30. In the embodiment shown, heater 30 employs catalytic combustion to generate heat. As the term is used herein, a burner refers to a heater that uses a catalytic process to produce heat. A heater refers to any mechanism or system for producing heat in a fuel processor. A fuel processor of the present invention may alternatively employ an electrical mechanism that, for example, uses electrical resistance and electrical energy to produce heat. Although fuel processor 15 is mainly discussed with respect to a chemical-based heater/heater 30, the fuel processor may alternatively include other sources of heat.

As shown in FIG. 2B, catalytic heater 30 comprises four burner chambers 105a-d that surround reformer 32 in cross section. A catalyst 104 disposed in each burner chamber 105 helps a burner fuel passed through the chamber generate heat. Heater 30 includes an inlet that receives methanol 17 from boiler 108 via a channel in one of end plates 182 or 184. In one embodiment, methanol produces heat in heater 30 and catalyst 104 facilitates the methanol production of heat. In another embodiment, waste hydrogen from fuel cell 20 produces heat in the presence of catalyst 104. Suitable burner catalysts 104 may include platinum or palladium coated onto alumina pellets for example. Other materials suitable for catalyst 104 include iron, tin oxide, other noble-metal catalysts, reducible oxides, and mixtures thereof. Catalyst 104 is commercially available from a number of vendors known to those of skill in the art as small pellets. The pellets may be packed into burner chamber 105 to form a porous bed or otherwise suitably filled into the burner chamber volume. Catalyst 104 pellet sizes may be varied relative to the cross sectional size of burner chamber 105. Catalyst 104 may also comprise catalyst materials listed above coated onto a metal sponge or metal foam or wash coated onto the walls of burner chamber 105.

Some fuels generate additional heat in heater 30 or generate heat more efficiently with elevated temperatures. Fuel processor 15 includes a boiler 108 that heats methanol before heater 30 receives the fuel. Boiler 108 is disposed in proximity to heater 30 to receive heat generated in heater 30; the heat transfers via conduction through monolithic structure 100 from heater 30 to boiler 108 and via convection from boiler 108 walls to the methanol passing therethrough.

Air including oxygen enters fuel processor 15 via an air inlet port 191 in interconnect 190. Heater 30 uses the oxygen for catalytic combustion of methanol.

Heater 30 typically operates at an elevated temperature. In one embodiment, fuel processor 15 comprises a dewar 150 to improve thermal management for fuel processor 15. Dewar 150 at least partially thermally isolates components internal to housing 152—such as heater 30—and contains heat within fuel processor 15. Dewar 150 is shaped and sized to form two sets of air chambers/channels: a first air chamber 156 between the outside of monolithic structure 100 and the inside of dewar 150; and a second air chamber 158 between the outside of dewar 150 and the inside of housing 152. The chambers 156 and 158 include spaces for airflow and regenerative cooling. More specifically, dewar 150 is configured such that air passing through dewar chambers 156 and 158 receives heat generated in heater 30. Air is routed through one or both channels 156 and 158 to improve thermal heat management for fuel processor 15 by: a) allowing incoming air to be pre-heated before entering heater 30, and b) dissipating waste heat generated by burner 32 into the incoming air before the heat reaches the outside of housing 152. Dewar 150 offers thus two functions for fuel processor 15: a) it permits active cooling of components of fuel processor 15 before the heat reaches an outer portion of the fuel processor, and b) it pre-heats the air going to heater 30 to improve thermal efficiency.

In one embodiment, the fuel cell system runs anode exhaust from the fuel cell 20 back to fuel processor. As shown in FIG. 1B, line 38 routes unused hydrogen from fuel cell 20 to a burner inlet, which provides the anode exhaust to heater 30 (or to the regenerator 36 and then to burner inlet 109 and into heater 30). Heater 30 includes a thermal catalyst that reacts with the unused hydrogen to produce heat. Since hydrogen consumption within a PEM fuel cell 20 is often incomplete and the anode exhaust often includes unused hydrogen, re-routing the anode exhaust to heater 30 allows a fuel cell system to capitalize on unused hydrogen and increase hydrogen usage and energy efficiency. The fuel cell system thus provides flexibility to use different fuels in a catalytic heater 30. For example, if fuel cell 20 can reliably and efficiently consume over 90% of the hydrogen in the anode stream, then there may not be sufficient hydrogen to maintain reformer and boiler operating temperatures in fuel processor 15. Under this circumstance, methanol supply is increased to produce additional heat to maintain the reformer and boiler temperatures.

Burner inlet 109 traverses monolithic structure 100 and carries anode exhaust from fuel cell 20 before provision into heater 30. Disposing burner inlet 109 adjacent to a burner chamber 105 also heats the incoming anode exhaust, which reduces heat transferred to the anode exhaust within the burner chambers 105.

A fuel cell package may include other fuel processor designs. Many architectures employ a planar reformer disposed on top or below to a planar burner. Micro-channel designs fabricated in silicon that commonly employ such stacked planar architectures may be used. Other fuel processors may be used that process fuels other than methanol. Fuels other than methanol were listed above, and processors for these fuels are not detailed herein for sake of brevity.

Interconnect 190 is disposed at least partially between fuel cell 20 and fuel processor 15, and forms a structural and plumbing intermediary between the two. One or more conduits traverse interconnect 190 and permit gaseous and/or fluid communication between the fuel cell and the fuel processor. The interconnect 190 also reduces plumbing complexity and space, which leads to a smaller fuel cell system package. The interconnect 190 includes a set of conduits, formed in the structure of the interconnect 190, that each communicate a liquid or gas between the fuel processor and the fuel cell.

Interconnect 190 may include one or more materials. In one embodiment, interconnect 190 is constructed from a suitably rigid material that adds structural integrity to a fuel cell package and provides rigid connectivity between a fuel cell and fuel processor. Many metals are suitable for use with interconnect 190.

Interconnect 190 includes plumbing for communicating any number of gases and liquids between a fuel cell and fuel processor. For the fuel cell system 10 of FIG. 1B, plumbing serviced by interconnect 190 includes 1) a hydrogen line 39 from the fuel processor to the fuel cell, 2) a line 38 returning unused hydrogen from the fuel cell back to the fuel processor, 3) an oxygen line 33 from the fuel cell to the fuel processor, and 4) a reformer or burner exhaust line 37 traveling from the fuel processor to the fuel cell. Other gas or liquid transfers between a fuel cell and fuel processor, in either direction, may be serviced by interconnect 190. In one embodiment, interconnect 190 internally incorporates all plumbing for gases and liquids it transfers to minimize exposed tubing and package size.

Fuel Cell

Figure 3A:
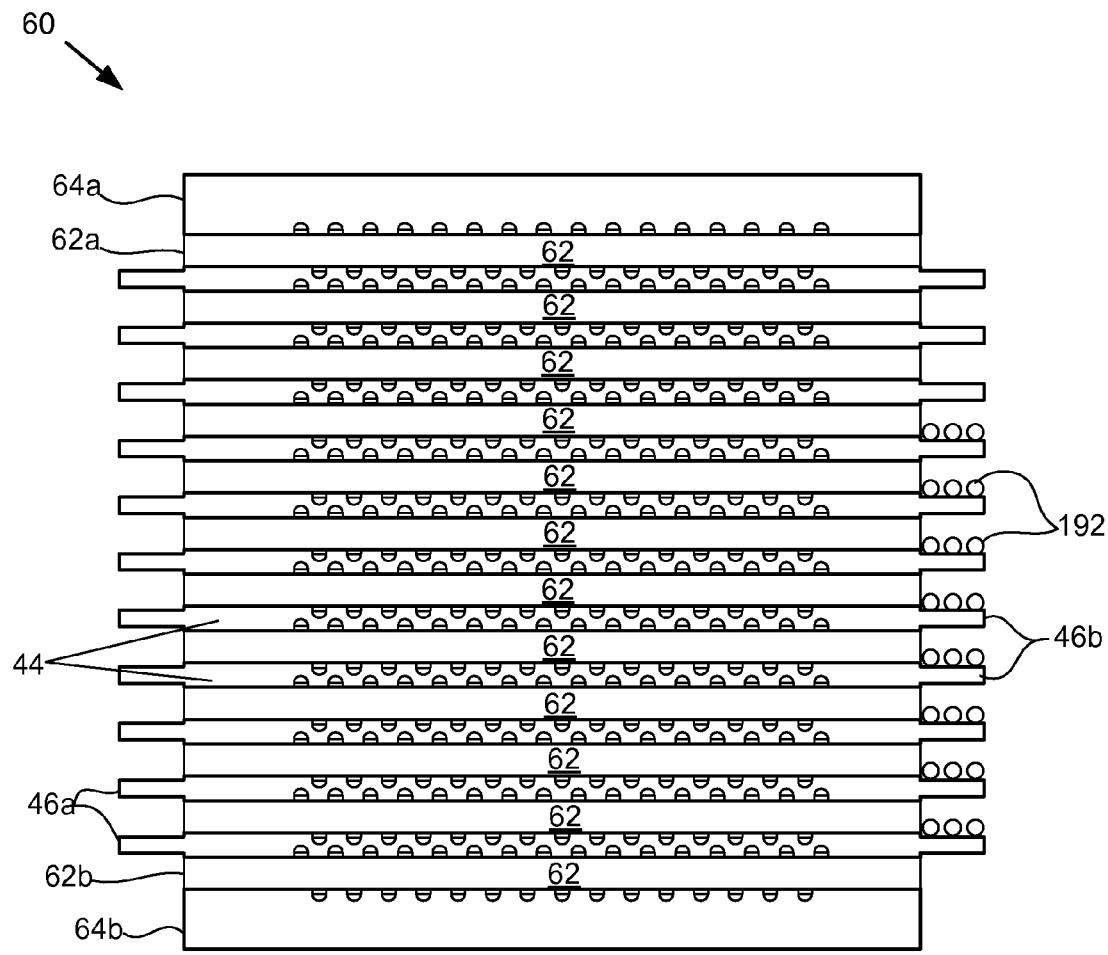
FIG. 3A illustrates a simplified cross sectional view of a fuel cell stack in accordance with one embodiment of the present invention.
Figure 3B:
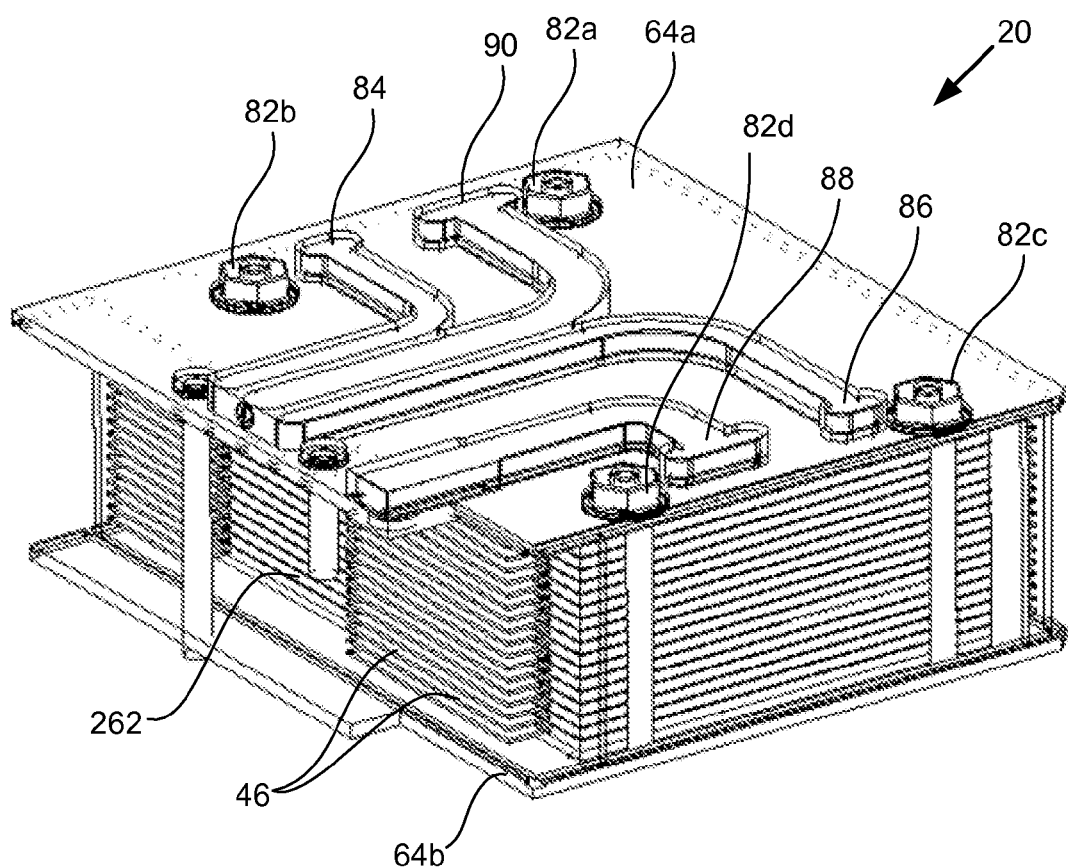
FIG. 3B illustrates an outer top perspective view of a fuel cell stack and fuel cell in accordance with another embodiment of the present invention.

FIG. 3A illustrates a simplified cross sectional view of a fuel cell stack 60 for use in fuel cell 20 in accordance with one embodiment of the present invention. FIG. 3B illustrates an outer top perspective view of a fuel cell stack 60 and fuel cell 20 in accordance with another embodiment of the present invention.

Referring initially to FIG. 3A, fuel cell stack 60 includes a set of bi-polar plates 44 and a set of membrane electrode assembly (MEA) layers 62. Two MEA layers 62 neighbor each bi-polar plate 44. With the exception of topmost and bottommost membrane electrode assembly layers 62a and 62b, each MEA 62 is disposed between two adjacent bi-polar plates 44. For MEAs 62a and 62b, top and bottom end plates 64a and 64b include a channel field 72 on the face neighboring an MEA 62.

The bi-polar plates 44 in stack 60 also each include one or more heat transfer appendages 46. As shown, each bi-polar plate 44 includes a heat transfer appendage 46a on one side of the plate and a heat transfer appendage 46b on the opposite side. Heat transfer appendages 46 are discussed in further detail below.

The number of bi-polar plates 44 and MEA layers 62 in each set may vary with design of fuel cell stack 60. Stacking parallel layers in fuel cell stack 60 permits efficient use of space and increased power density for fuel cell 20 and a fuel cell package 10 including fuel cell 20. In one embodiment, each membrane electrode assembly 62 produces 0.7 V and the number of MEA layers 62 is selected to achieve a desired voltage. Fuel cell 20 size and layout may also be tailored and configured to output a given power.

Referring to FIG. 3B, top and bottom end plates 64a and 64b provide mechanical protection for stack 60. End plates 64 also hold the bi-polar plates 44 and MEA layers 62 together, and apply pressure across the planar area of each bi-polar plate 44 and each MEA 62. End plates 64 may include steel or another suitably stiff material. Bolts 82a-d connect and secure top and bottom end plates 64a and 64b together.

Fuel cell 20 includes two anode manifolds (84 and 86). Each manifold delivers a product or reactant gas to or from the fuel cell stack 60. More specifically, each manifold delivers a gas between a vertical manifold created by stacking bi-polar plates 44 (FIG. 3C) and plumbing external to fuel cell 20. Inlet hydrogen manifold 84 is disposed on top end plate 64a, couples with an inlet conduit to receive hydrogen gas, and opens to an inlet hydrogen manifold 102 (FIG. 3C) that is configured to deliver inlet hydrogen gas to a channel field 72 on each bi-polar plate 44 in stack 60. Outlet manifold 86 receives outlet gases from an anode exhaust manifold 104 (FIG. 3C) that is configured to collect waste products from the anode channel fields 72 of each bi-polar plate 44. Outlet manifold 86 may provide the exhaust gases to the ambient space about the fuel cell. In another embodiment, manifold 86 provides the anode exhaust to line 38, which transports the unused hydrogen back to the fuel processor during start-up.

Fuel cell 20 includes two cathode manifolds: an inlet cathode manifold or inlet oxygen manifold 88, and an outlet cathode manifold or outlet water/vapor manifold 90. Inlet oxygen manifold 88 is disposed on top end plate 64a, couples with an inlet conduit (conduit 31, which draws air from the ambient room) to receive ambient air, and opens to an oxygen manifold 106 (FIG. 3C) that is configured to deliver inlet oxygen and ambient air to a channel field 72 on each bi-polar plate 44 in stack 60. Outlet water/vapor manifold 90 receives outlet gases from a cathode exhaust manifold 108 (FIG. 3C) that is configured to collect water (typically as a vapor) from the cathode channel fields 72 on each bi-polar plate 44.

As shown in FIG. 3B, manifolds 84, 86, 88 and 90 include molded channels that each travel along a top surface of end plate 64a from their interface from outside the fuel cell to a manifold in the stack. Each manifold or channel acts as a gaseous communication line for fuel cell 20 and may comprise a molded channel in plate 64 or a housing of fuel cell 20. Other arrangements to communicate gases to and from stack 60 are contemplated, such as those that do not share common manifolding in a single plate or structure.

In one embodiment, fuel cell 20 requires no external humidifier or heat exchanger and the stack 60 only needs hydrogen and air to produce electrical power. Alternatively, fuel cell 20 may employ humidification of the cathode to fuel cell 20 improve performance. For some fuel cell stack 60 designs, humidifying the cathode increases the power and operating life of fuel cell 20.

Figure 3C:
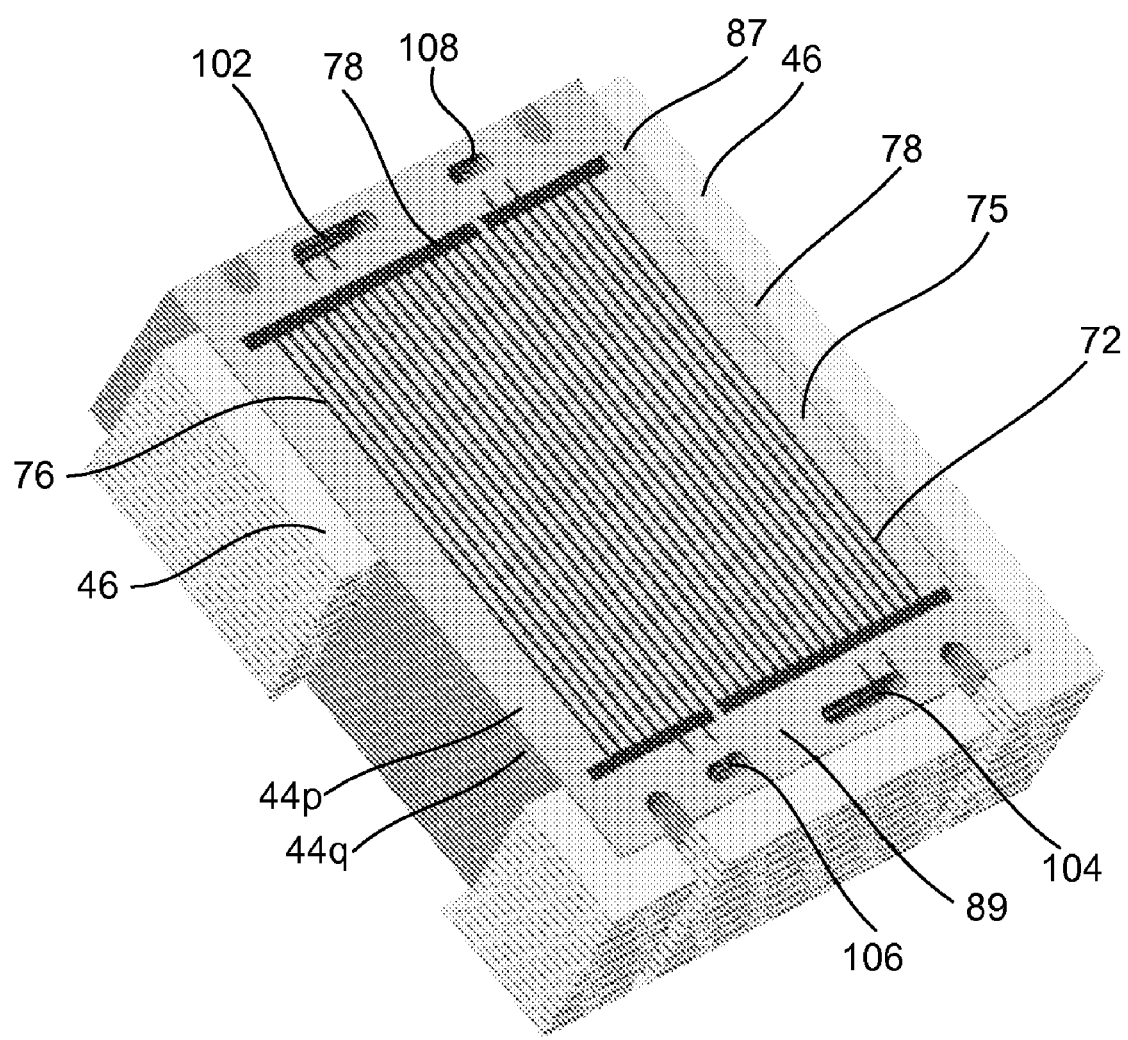
FIG. 3C illustrates a top perspective view of a stack of bi-polar plates in accordance with one embodiment of the present invention.

FIG. 3C illustrates a top perspective view of a stack of bi-polar plates (with the top two plates labeled 44p and 44q) in accordance with one embodiment of the present invention. Bi-polar plate 44 is a single plate 44 with first channel fields 72 disposed on opposite faces 75 of the plate 44.

Functionally, bi-polar plate 44 a) delivers and distributes reactant gases to the gas diffusion layers 122 and 124 and their respective catalysts, b) maintains separation of the reactant gasses from one another between MEA layers 62 in stack 60, c) exhausts electrochemical reaction byproducts from MEA layers 62, d) facilitates heat transfer to and/or from MEA layers 62 and fuel cell stack 60, and e) includes gas intake and gas exhaust manifolds for gas delivery to other bi-polar plates 44 in the fuel stack 60.

Bi-polar plate 44 includes a channel field 72 or "flow field" on each face of plate 44. Each channel field 72 includes one or more channels 76 formed into the substrate 89 of plate 44 such that the channel rests below the surface of plate 44. Each channel field 72 distributes one or more reactant gasses to an active area for the fuel cell stack 60. For fuel cell stack 60, each channel field 72 is configured to receive a reactant gas from an intake manifold 102 or 106 and configured to distribute the reactant gas to a gas diffusion layer 122 or 124. Each channel field 72 also collects reaction byproducts for exhaust from fuel cell 20.

Bi-polar plate 44 may include one or more heat transfer appendages 46. Each heat transfer appendage 46 permits external thermal management of internal portions of fuel cell stack 60. More specifically, appendage 46 may be used to heat or cool internal portions of fuel cell stack 60 such as internal portions of each attached bi-polar plate 44 and any neighboring MEA layers 62, for example. Heat transfer appendage 46 is laterally arranged outside channel field 72. In one embodiment, appendage 46 is disposed on an external portion of bi-polar plate 44. External portions of bi-polar plate 44 include any portions of plate 44 proximate to a side or edge of the substrate included in plate 44. External portions of bi-polar plate 44 typically do not include a channel field 72. For the embodiment shown, heat transfer appendage 46 substantially spans a side of plate 44 that does not include intake and output manifolds 102-108. For the embodiment shown in FIG. 2A, plate 44 includes two heat transfer appendages 46 that substantially span both sides of plate 44 that do not include a gas manifold.

Peripherally disposing heat transfer appendage 46 allows heat transfer between inner portions of plate 44 and the externally disposed appendage 46 via the plate substrate 89. Conductive thermal communication refers to heat transfer between bodies that are in contact or that are integrally formed. Thus, lateral conduction of heat between external portions of plate 44 (where the heat transfer appendage 46 attaches) and central portions of bi-polar plate 44 occurs via conductive thermal communication through substrate 89. In one embodiment, heat transfer appendage 46 is integral with substrate material 89 in plate 44. Integral in this sense refers to material continuity between appendage 46 and plate 44. An integrally formed appendage 46 may be formed with plate 44 in a single molding, stamping, machining or MEMs process of a single metal sheet, for example. Integrally forming appendage 46 and plate 44 permits conductive thermal communication and heat transfer between inner portions of plate 44 and the heat transfer appendage 46 via substrate 89. In another embodiment, appendage 46 comprises a material other than that used in substrate 89 that is attached onto plate 44 and conductive thermal communication and heat transfer occurs at the junction of attachment between the two attached materials.

Heat may travel to or form the heat transfer appendage 46. In other words, appendage 46 may be employed as a heat sink or source. Thus, heat transfer appendage 46 may be used as a heat sink to cool internal portions of bi-polar plate 44 or an MEA 62. Fuel cell 20 employs a cooling medium to remove heat from appendage 46. Alternatively, heat transfer appendage 46 may be employed as a heat source to provide heat to internal portions of bi-polar plate 44 or an MEA 62. In this case, a catalyst may be disposed on appendage 46 to generate heat in response to the presence of a heating medium.

For cooling, heat transfer appendage 46 permits integral conductive heat transfer from inner portions of plate 44 to the externally disposed appendage 46. During hydrogen consumption and electrical energy production, the electrochemical reaction generates heat in each MEA 62. Since internal portions of bi-polar plate 44 are in contact with the MEA 62, a heat transfer appendage 46 on a bi-polar plate 44 thus cools an MEA 62 adjacent to the plate via a) conductive heat transfer from MEA 62 to bi-polar plate 44 and b) lateral thermal communication and conductive heat transfer from central portions of the bi-polar plate 44 in contact with the MEA 62 to the external portions of plate 44 that include appendage 46. In this case, heat transfer appendage 46 sinks heat from substrate 89 between a first channel field 72 on one face 75 of plate 44 and a second channel field 72 on the opposite face of plate 44 to heat transfer appendage 46 in a direction parallel to a face 75 of plate 44. When a fuel cell stack 60 includes multiple MEA layers 62, lateral thermal communication through each bi-polar plate 44 in this manner provides inter-layer cooling of multiple MEA layers 62 in stack 60 — including those layers in central portions of stack 60.

Fuel cell 20 may employ a cooling medium that passes over heat transfer appendage 46. The cooling medium receives heat from appendage 46 and removes the heat from fuel cell 20. Heat generated internal to stack 60 thus conducts through bi-polar plate 44, to appendage 46, and heats the cooling medium via convective heat transfer between the appendage 46 and cooling medium. Air is suitable for use as the cooling medium.

Heat transfer appendage 46 may be configured with a thickness that is less than the thickness between opposite faces 75 of plate 44. The reduced thickness of appendages 46 on adjacent bi-polar plates 44 in the fuel cell stack 60 forms a channel between adjacent appendages. Multiple adjacent bi-polar plates 44 and appendages 46 in stack form numerous channels. Each channel permits a cooling medium or heating medium to pass therethrough and across heat transfer appendages 46. In one embodiment, fuel cell stack 60 includes a mechanical housing that encloses and protects stack 60. Walls of the housing also provide additional ducting for the cooling or heating medium by forming ducts between adjacent appendages 46 and the walls.

The cooling medium may be a gas or liquid. Heat transfer advantages gained by high conductance bi-polar plates 44 allow air to be used as a cooling medium to cool heat transfer appendages 46 and stack 60. For example, fan 37 of FIG. 1B moves air through the mechanical housing, through the channels between appendages to cool heat transfer appendages 46 and fuel cell stack 60, and out an exhaust hole or port in the mechanical housing. Fuel cell system 10 may then include active thermal controls based on temperature feedback. Increasing or decreasing coolant fan speed regulates the amount of heat removal from stack 60 and the operating temperature for stack 60. In one embodiment of an air-cooled stack 60, the coolant fan speed increases or decreases as a function of the actual cathode exit temperature, relative to a desired temperature set-point.

For heating, heat transfer appendage 46 allows integral heat transfer from the externally disposed appendage 46 to inner portions of plate 44 and any components and portions of fuel cell 20 in thermal communication with inner portions of plate 44. A heating medium passed over the heat transfer appendage 46 provides heat to the appendage. Heat convected onto the appendage 46 then conducts through the substrate 89 and into internal portions of plate 44 and stack 60, such as portions of MEA 62 and its constituent components.

Although the present invention provides a bi-polar plate 44 having channel fields 72 that distribute hydrogen and oxygen on opposing sides of a single plate 44, many embodiments described herein are suitable for use with conventional bi-polar plate assemblies that employ two separate plates for distribution of hydrogen and oxygen.

While the present invention has mainly been discussed so far with respect to a reformed methanol fuel cell (RMFC), the present invention may also apply to other types of fuel cells, such as a solid oxide fuel cell (SOFC), a phosphoric acid fuel cell (PAFC), a direct methanol fuel cell (DMFC), or a direct ethanol fuel cell (DEFC). In this case, fuel cell 20 includes components specific to these architectures, as one of skill in the art will appreciate. A DMFC or DEFC receives and processes a fuel. More specifically, a DMFC or DEFC receives liquid methanol or ethanol, respectively, channels the fuel into the fuel cell stack 60 and processes the liquid fuel to separate hydrogen for electrical energy generation. For a DMFC, channel fields 72 in the bi-polar plates 44 distribute liquid methanol instead of hydrogen. Hydrogen catalyst 126 described above would then comprise a suitable anode catalyst for separating hydrogen from methanol. Oxygen catalyst 128 would comprise a suitable cathode catalyst for processing oxygen or another suitable oxidant used in the DMFC, such as peroxide. In general, hydrogen catalyst 126 is also commonly referred to as an anode catalyst in other fuel cell architectures and may comprise any suitable catalyst that removes hydrogen for electrical energy generation in a fuel cell, such as directly from the fuel as in a DMFC. In general, oxygen catalyst 128 may include any catalyst that processes an oxidant in used in fuel cell 20. The oxidant may include any liquid or gas that oxidizes the fuel and is not limited to oxygen gas as described above. An SOFC, PAFC or MCFC may also benefit from inventions described herein, for example. In this case, fuel cell 20 comprises an anode catalyst 126, cathode catalyst 128, anode fuel and oxidant according to a specific SOFC, PAFC or MCFC design.

Heat Efficient Systems

The present invention improves thermal efficiency of a fuel cell system. In one embodiment, a fuel cell system runs a heating medium to the fuel cell to heat the fuel cell.

The heating medium may include any hot gas, a fuel processed in the fuel cell system to make hydrogen (after processing and without any processing), a dedicated heating medium for heating the fuel cell, and/or hydrogen for example. Other suitable heating mediums include any heated gases emitted from fuel processor 15, or heated via a heat exchanger that receives heat from fuel processor 15 and/or fuel cell 20, for example.

Dedicated plumbing transports the heating medium to the fuel cell or a specific portion of the fuel cell. For example, in the design shown in FIG. 1B, line 35 transports heated gases to fan 37, which moves the heated gases over the fuel cell stack and heat transfer appendages 46. In this case, line 35 may continue through the fuel cell housing and open in the proximity of one or more heat transfer appendages. In another embodiment, the heating medium is passed to a thermal catalyst that is remote from the fuel cell, and a heat transfer pipe conducts the heat to the fuel cell. As the term is used herein, plumbing may comprise any tubing, piping and/or channeling (e.g., in interconnect 190 and dedicated channels in the fuel cell) that communicates a gas or liquid from one location to a second location. The plumbing may also comprise one or more valves, gates or other devices to facilitate and control flow.

In one embodiment, the heating medium comprises a heated gas having a temperature greater than that of the fuel cell or heat transfer appendage 46. Exhaust gases from heater 30 or reformer 32 of fuel processor 15 may each include elevated temperatures that are suitable for heating. A catalytic burner or electrical resistance heater also operates at elevated temperatures and produced hot gases. Air exhausted from an electric heater chamber or a catalytic burner chamber is often greater than about 100 degrees Celsius. For many catalytic burners, depending on the fuel employed, the heating medium is commonly greater than about 200 degrees Celsius when the heating medium leaves the fuel processor. In one embodiment, the reformer exhaust is at an elevated temperature corresponding to the temperature in reformer 32 and the heating medium includes hot gases. Reformer exhausts above 100 degrees Celsius are common. The heated gases are transported to the fuel cell for convective heat transfer to the fuel cell, such as passing the heated gases over one or more heat transfer appendages 46 for convective heat transfer from the warmer gases into the cooler heat transfer appendages and/or to the walls of the fuel cell. Heat then conducts from these external portions into the fuel stack and its internal components, such as the MEAs.

The heating medium may also rely on catalytic interaction to generate heat. Fuel cell 20 then comprises a thermal catalyst that facilitates production of heat in the fuel cell in the presence of the heating medium. As one of skill in the art will appreciate, the particular catalyst and heating medium used may vary (e.g. with the fuel cell system and its inlet fuel and operating temperatures) but will generally correspond to each other. Suitable catalysts for methanol, such as platinum or palladium coated onto alumina pellets, are described above with respect to catalyst 104 in heater 30. Other suitable methanol catalysts 192 include a platinum/ palladium mix, iron, ruthenium, and combinations thereof. Each of these will react with methanol and other hydrocarbon fuels to generate heat. For catalytic heat generation in fuel cell 20, the plumbing transports the heating medium to facilitate gaseous interaction with the catalyst.

In one embodiment, the fuel cell comprises a catalyst (e.g., catalyst 192 of FIG. 3A) disposed in contact with, or in proximity to, one or more heat transfer appendages 46. The catalyst 192 generates heat when the heating medium passes over it. The heating medium in this case may comprise any gas or fluid that reacts with catalyst 192 to generate heat. Typically, catalyst 192 and the heating medium employ an exothermic chemical reaction to generate heat. Heat transfer appendage 46 and plate 44 then conduct heat into the fuel cell stack 60, e.g. to heat internal MEA layers 62.

For example, catalyst 192 may comprise platinum and the heating medium includes fuel 17. The methanol 17 is heated to a gaseous state before it enters fuel cell 20 (e.g., in the burner or reformer). This allows gaseous transportation of the heating medium and gaseous interaction between fuel 17 and catalyst 192 to generate heat. A fan, for example, disposed on one of the walls then moves the gaseous methanol within fuel cell 20 and over the catalyst 192.

In one embodiment, the heating medium includes fuel 17 from storage device 16. Three suitable routes for the fuel to reach the fuel cell (for heating) include: a) heater 30 exhaust, b) reformer 32 exhaust, and/or c) a dedicated line that communicates the fuel 17 directly from the storage device 16 to the fuel cell for catalytic heating.

FIG. 1B shows plumbing that communicates gaseous output of the heater 30 to fuel cell 20. In this case, heater 30 is a catalytic burner and the heating medium comprises the fuel 17. Catalytic combustion in heater 30 is often incomplete and the burner exhaust gases include unused and gaseous methanol. Line 35 transports the unused methanol to a thermal catalyst in fuel cell 20. This efficiently uses any fuel remaining in the burner exhaust to heat the fuel cell 20.

Figure 4:
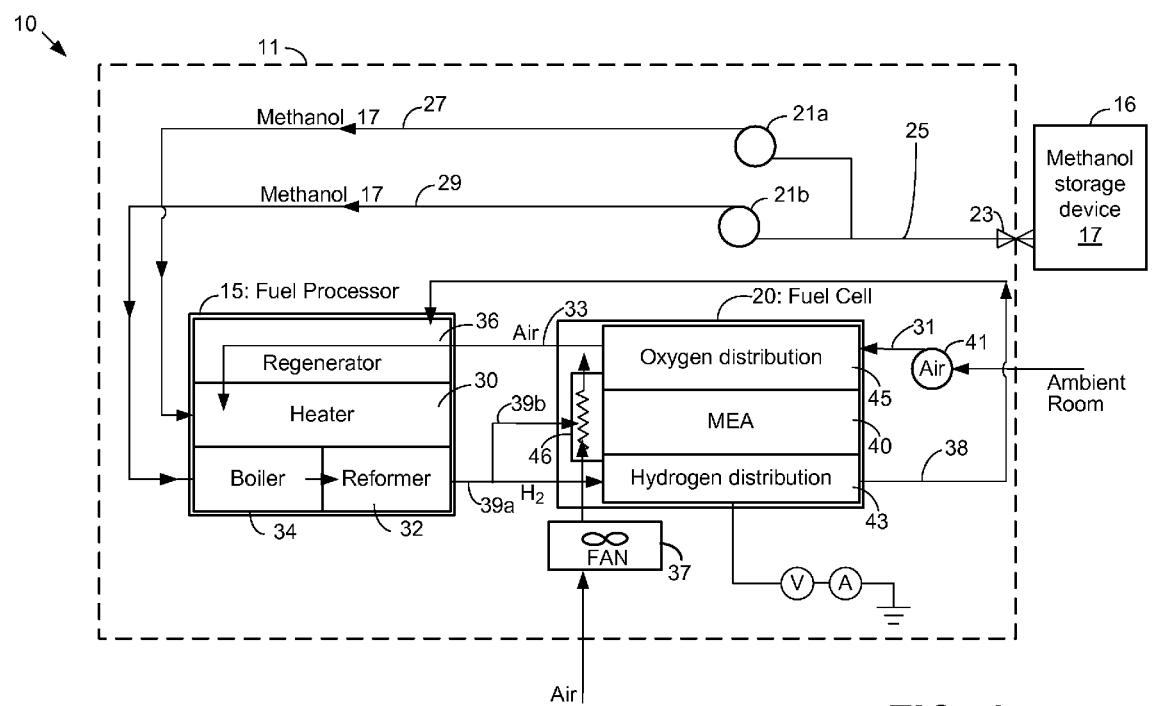
FIG. 4 shows another embodiment of the invention where catalyst disposed in proximity to the fuel cell is configured to interact with exhaust from a reformer.

FIG. 4 shows another embodiment of the invention where reformer exhaust is passed to fuel cell 20 for heating. Line 39 splits into two lines: line 39a that communicates reformate to a hydrogen intake manifold in fuel cell 20, and line 39b that communicates the reformate to fuel cell 20 for heating. A valve is disposed at the junction of line 39a and 39b and controls which path the reformate takes. Line 39b may also transport the reformer exhaust to fan 37, which moves the heating medium within fuel cell 20 and across the heat transfer appendages.

Hydrogen production in reformer 32 is often incomplete and the reformer exhaust/heating medium includes unprocessed and gaseous methanol. This is typical during system start-up before the fuel processor and/or fuel cell has reached their respective operating temperatures and the reformer exhaust gases include unprocessed methanol in the reformate. Fuel cell 20 then comprises a thermal catalyst that facilitates production of heat in the fuel cell in the presence of methanol. Boiler 34 vaporizes the methanol prior to reaching reformer 32. In this case, line 39b transports the gaseous methanol and reformate to the thermal catalyst in fuel cell 20. Suitable methanol catalysts, such as platinum or palladium coated onto alumina pellets, were also described above with respect to burner 30 of FIG. 30. This embodiment efficiently uses any unprocessed fuel remaining in the reformer exhaust (after hydrogen processing in fuel processor 15) to heat the fuel cell.

In another embodiment, a fuel cell system of the present invention includes a separate and dedicated fuel feed that directly supplies fuel 17 to fuel cell 20 for heating and reaction with a thermal catalyst. A separate pump then controls fuel flow along this line for heating purposes.

The fuel is typically vaporized prior to reaching the catalyst to facilitate transportation and catalytic interaction. A separate fuel line that communicates fuel from the cartridge may employ a designated electrical heater configured to vaporize the fuel. The reformer and burner routes already vaporize the fuel in the fuel processor, which efficiently and doubly uses heat from heater 30 to pre-heat fuel a) in the fuel processor and b) traveling to fuel cell 20 for heating.

Hydrogen may also be used as a heating medium. In a specific embodiment, the thermal catalyst is configured to interact with hydrogen output from the reformer or fuel cell. Reformer hydrogen is particularly useful during start-up before hydrogen concentration in the reformate has reached an acceptable level for use in the fuel cell (the fuel processor has not warmed up yet), or the fuel cell has not reached an operating temperature. When hydrogen is used as the heating medium, catalyst 192 includes a material that generates heat in the presence of hydrogen, such as palladium or platinum. In another embodiment, the anode exhaust is transported to the thermal catalyst to heat the fuel cell using hydrogen that was not processed in the fuel cell 20.

Heating may occur at various times. In one embodiment, the heating medium is transported to the fuel cell during a start-up period before the fuel cell reaches an operating temperature or before the fuel cell begins generating electrical energy, e.g., in response to a request for electrical energy by an electronics device powered by the fuel cell. Heating a fuel cell in this manner allows fuel cell components, such as the MEA, to reach operating temperatures sooner—and thus expedites start-up for the fuel cell system and expedites initial delivery of electrical energy.

In another embodiment, the heating medium is transported from the fuel processor to the fuel cell during a period of non-activity in which the fuel cell does not generate electrical energy and a component of the fuel cell cools below its operating temperature. Since many fuel cells require elevated temperatures for operation and the electrical energy generating process is exothermic, the fuel cell usually does not require external heating during electrical energy generation. However, when electrical generation ceases for an extended time and one or more components cool below a threshold operating temperature, the heating medium may then be transported from the fuel processor to the fuel cell to regain the operating temperature and resume electrical energy generation sooner. This also permits operating temperatures in a fuel cell to be maintained when electrical energy is not being generated by the fuel cell, thus allowing electrical energy to be generated instantly upon request (e.g., a system standby mode in which the fuel cell remains at operating temperature, despite no continuous request for electricity).

The thermal catalyst may be flexibly located in the system. Many fuel cell systems of the present invention are provided in portable packages. In general, the catalyst can be located anywhere in the package. As will be described below, a heat transfer pipe between the thermal catalyst and fuel cell permits the catalyst to be separated from the fuel cell in the package.

In one embodiment, the catalyst is disposed close enough to the fuel cell such that catalytic heat conductively transfers from the catalyst directly to the fuel cell cell. As shown in FIG. 3A, catalyst 192 is arranged on, and in contact with, each heat transfer appendage 46. In this case, the heating medium passes over each appendage 46 and reacts with thermal catalyst 192. This generates heat, which is absorbed via conductive thermal communication by the cooler appendage 46.

Wash coating may be employed to dispose catalyst 192 on each appendage 46. A ceramic support may also be used to bond catalyst 192 on an appendage 46. In a specific embodiment, the plumbing delivers the heating medium to one or more bulkheads that contain the catalyst proximate to the fuel cell or heat transfer appendages 46. The bulkhead refers to any closed space used to contain a thermal catalyst, and several examples are described below with respect to FIGS. 5A-5C. Additional catalyst arrangements are described in commonly owned and co-pending patent application Ser. No. 10/877,771 and entitled "EFFICIENT MICRO FUEL CELL SYSTEMS AND METHODS", which was incorporated by reference above.

Still referring to FIG. 3A, the heat transfers into fuel cell 20 via the fuel cell walls and/or one or more heat transfer appendages 46. For catalyst-based heating using a thermal catalyst disposed in proximity to a heat transfer appendage, heat then a) transfers from catalyst 192 to appendage 46, b) transfers laterally though bi-polar plate 44 via conductive heat transfer from outer lateral portions of the plate that include heat transfer appendage 46 to central portions of bi-polar plate 44 in contact with the MEA layers 62, and c) conducts from bi-polar plate 44 to MEA layer 62. When a fuel cell stack 60 includes multiple MEA layers 62, lateral heating through each bi-polar plate 44 provides interlayer heating of multiple MEA layers 62 in internal portions of stack 60, including the x-y-z central and hard to reach volume portions, which expedites fuel cell 20 warm up.

Bi-polar plates 44 of FIG. 3A include heat transfer appendages 46 on each side. In a specific embodiment, one set of heat transfer appendages 46a is used for cooling while the other set of heat transfer appendages 46b is used for heating. Alternatively, the same appendages may be used for heating and cooling. Or multiple appendages may be used for heating. Bi-polar plates 44 illustrated in FIG. 3C show plates 44 with four heat transfer appendages 46 disposed on three sides of stack 60, all of which may be used for heating and/or cooling, as desired by design. Appendage 46 arrangements can be otherwise varied to affect and improve heat dissipation and thermal management of fuel cell stack 60 according to other specific designs. For example, appendages 46 need not span a side of plate 44 as shown and may be tailored based on how the heating fluid is channeled through the housing.

A fuel cell system of the present invention may also include one or more sensors to help regulate thermal management. For example, a temperature sensor may detect temperature for a component in the fuel processor 15, such as a sensor arranged within burner 30 for detecting temperatures within the burner. Other components in fuel processor 15 whose temperature may be monitored by a sensor include: reformer 32, boiler 34, boiler 108 and gases at the inlet at outlet ports of each of these components. A temperature sensor may also detect temperature for a component in fuel cell 20. For example, a sensor may be arranged in contact with the substrate 89 of one or more bi-polar plates 44 for detecting the temperature of the plate. Other component in fuel cell 20 whose temperature may be monitored by sensor include: MEA layer 62 and gases in an inlet or outlet manifold. Suitable temperature sensors for use with the present invention are widely commercially available from numerous sources known to those of skill in the art.

Also described herein are catalyst containment systems for use with a fuel cell. A catalyst containment system locates and holds a thermal catalyst outside the fuel cell. As mentioned above, the thermal catalyst combines with the heating medium to catalytically generate heat for transfer to a fuel cell. One or more walls of the catalyst containment system may also facilitate heat transfer from the catalyst into the fuel cell.

Figure 5A:
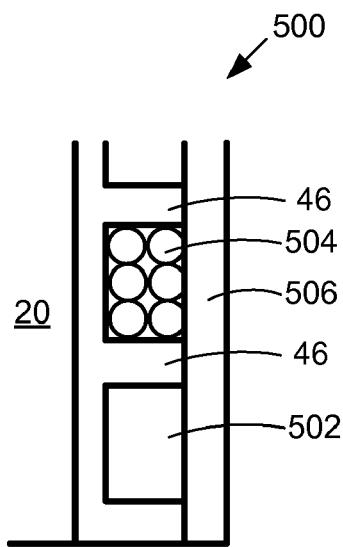
FIGS. 5A-5C show three exemplary catalyst containment systems that achieve catalyst containment in accordance with several embodiments of the present invention.
Figure 5B:
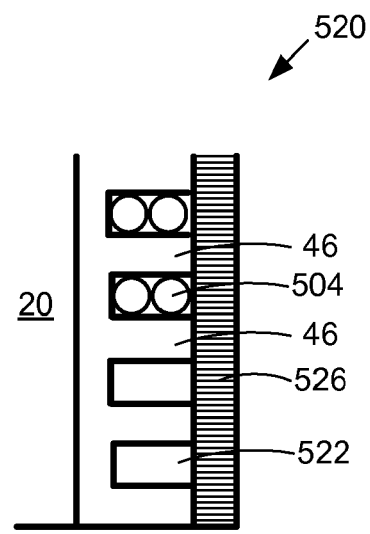
Figure 5C:
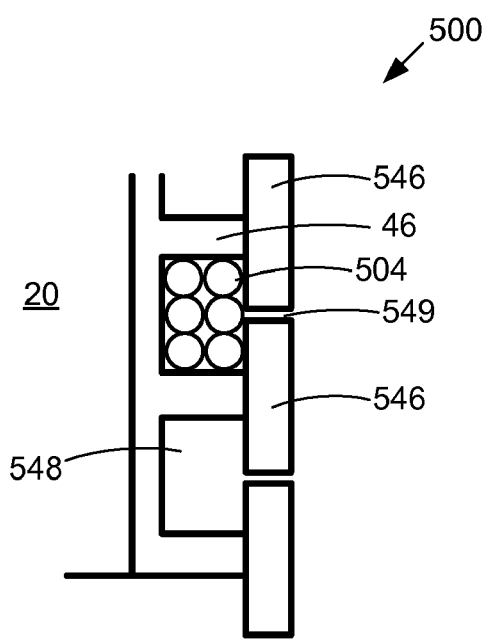

FIGS. 5A-5C show three exemplary catalyst containment systems 500, 520 and 540, respectively, that achieve catalyst containment in accordance with three embodiments of the present invention.

Generally, the catalyst containment system includes a set of walls that contain the thermal catalyst outside the fuel cell. The set of walls permit a heating medium to pass into the containment system and over the catalyst. Each wall may be porous or non-porous. Suitable porous walls include metal mesh materials and the like that allow a gas to pass therethough. Non-porous walls may include one or more walls that block and guide gaseous flow in the containment system and over the catalyst. In this case, the heating medium enters the catalyst containment system in one or more inlets and exits via one or more outlets (holes, apertures, etc.) in the walls. The non-porous walls may comprise a wall for other components in the fuel cell system. For example, an outer wall of fuel cell 20, interconnect 190, an external housing, may form one of the walls in a catalyst containment system.

In one embodiment, the catalyst containment system uses a heat transfer appendage 46 as one of the walls. As described above, a fuel cell may include one or more heat transfer appendages (also referred to as thermal fins) that conduct heat into and out of a fuel cell stack. In this case, in addition to being a multifunctional heat sink, the heat transfer appendage also cooperates in the catalyst containment system to hold a thermal catalyst. Contact between the thermal catalyst and heat transfer appendage/wall permits conductive heat transfer from the catalyst into the appendage, and then conductive heat transfer from the appendage into the fuel cell.

Referring first to FIG. 5A, a first catalyst containment system 500 has a gap 502 between appendages 46 that receives and houses catalyst 504 particles in between the appendages 46. Gap 502 may vary in size and can be enlarged and vertically expanded at the cost of active surface area of appendages 46 for the entire fuel cell stack. Gap 502 can also be narrowed by design and as permitted by catalyst 504 particle diameter. In one embodiment, gap 502 is from about 2 to about 5 millimeters. In specific embodiment, gap 502 is about 4 millimeters for catalyst 504 particles with a diameter of about 3 millimeters. A non-porous outer wall 506 with one or more apertures for inlet and outlet then rests outside the appendages 46 to contain catalyst 504 between the fuel cell 20, appendages 46 and outer wall 506. Another set of walls (not shown) also contain catalyst 504 at either end of the channel between appendages 46. These walls may include inner walls of the housing or package that contains fuel cell 20. Alternatively, a wall of fuel cell 20 may extend outward to cap the channels between appendages 46 at either end (normal to the page).

The length of appendages 46 can be varied according to thermal requirements, amount of catalyst 504, and fuel cell package space permit. In general, increasing appendage 46 length increases the size of catalyst containment system 500 and increases the ability of appendages 46 to transfer heat (heat or cool).

Catalyst containment system 520 (FIG. 5B) includes a configuration that includes a smaller gap 522 and increases direct contact between catalyst 504 and heat transfer appendages 46. The smaller gap 522 provides a tighter packing volume for catalyst 504, which increases conductive heat transfer from the catalyst 504 to heat transfer appendages 46. Gap 522 can be as narrow as permitted by the catalyst 504 particle diameter, and can be thicker than the catalyst diameter to permit packing. In a specific embodiment, gap 522 is from about 0.02 millimeters to about 5 millimeters. In another specific embodiment, gap 522 is less than 2 millimeters and the catalyst 504 particles have a diameter of about 1 millimeter. A porous outer wall 526 rests outside the appendages 46 to contain catalyst 504 between the fuel cell 20, appendages 46 and outer wall 526. Appendages 46 and gap 522 can be lengthened or shortened to optimize the heating and cooling area, depending on space available in a fuel cell.

Catalyst containment system 540 (FIG. 5C) includes an end wall 546 on the distal end of each appendage 46 that extends normal to the appendage 46 and above and below the appendage 46. Distal wall 546 helps contain catalyst 504, and cooperates with an outer wall of fuel cell 20 and appendages 46 to create a channel 548 between appendages 46 in which the catalyst 504 is located. End wall 546 may include caps attached onto each appendage, or may be integrally formed with each appendage 46, for example. Other ways to construct an end wall 546 in a fuel cell are also suitable for use herein. Containment system 540 provides a complete walling system and does not require any additional screens to contain catalyst 504. A clearance 549 between adjacent end walls 546 ensures that adjacent walls 546 do not touch and permits the heating medium to enter and exit. The size of clearance 549 is adjustable. In one embodiment, clearance 549 is increased to improve flow of a heating medium to and from the thermal catalyst. As before, the gap between appendages 46 in system 540 and the extended length of each appendage 46 can be modified based on required cooling and heating as well as catalyst diameter.

Figure 6:
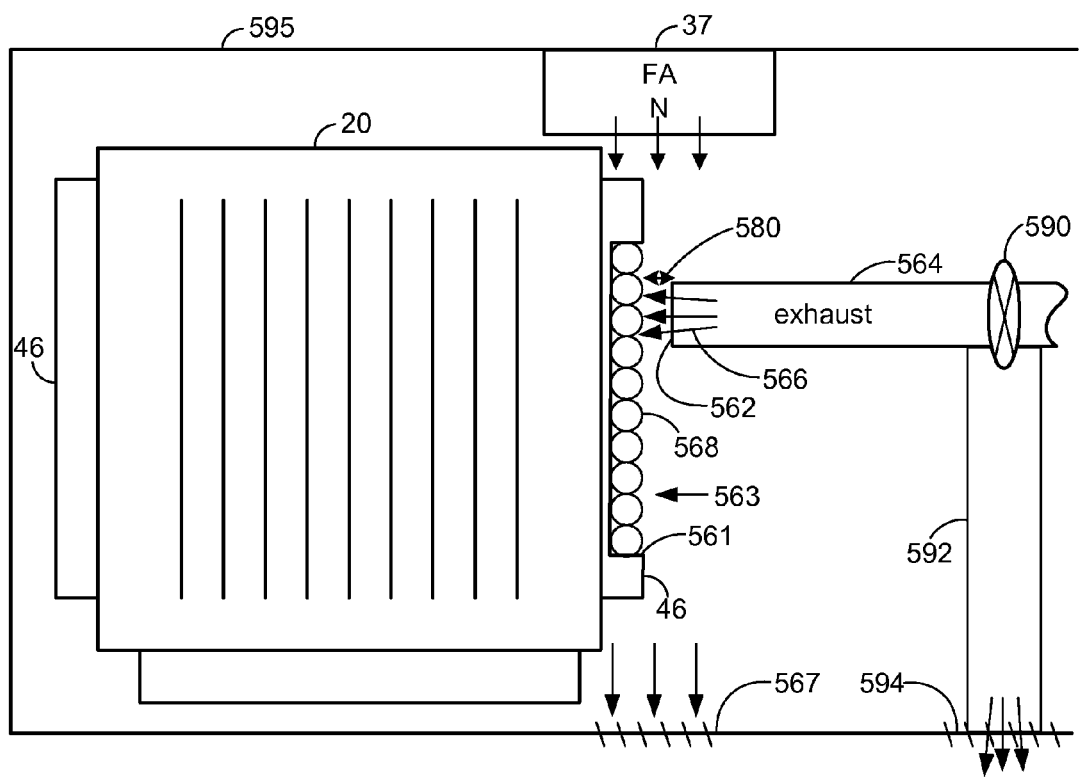
FIG. 6 shows a simplified illustration of a proximal heating system in accordance with one embodiment of the present invention

In one embodiment, the present invention delivers a heating medium from a plumbing outlet that is in close proximity to a thermal catalyst, which heats a fuel cell. FIG. 6 shows a simplified illustration of this proximal delivery in accordance with one embodiment of the present invention. As shown, a portion 561 of heat transfer appendage has been cut away to show a thermal catalyst 568 arranged in a catalyst bed 563 (a contiguous volume of catalyst 568) between appendages 46 of fuel cell 20.

In one embodiment, the exhaust is released within the walls of a containment system or within the catalyst bed 563. In this case, a heating medium 566 (such as burner exhaust and fuel included therein) is forced to escape through catalyst bed 563 and thereby interact with additional catalyst 568 as it escapes. This generates heat regardless of escape velocity for heating medium 566. When the heating medium includes a high escape velocity, such as small molecule gases like hydrogen, this improves interaction between the heating medium and catalyst and generates more heat.

In general, proximity refers to the heating medium being released close enough to the thermal catalyst 568 such that heat is generated at the catalyst. In another embodiment, the heating medium is delivered and released outside the walls of a containment system and proximity includes releasing the exhaust at a short distance to catalyst 568 (which also incorporates releasing the heating medium within the catalyst bed or containment system). Referring to FIG. 6, a distance 560 from an outlet 562 of plumbing 564 to catalyst 568 in bed 563 characterizes proximity between the two. It is understood that a thermal catalyst 568 disposed in bed 563 covers a significant area. In this case, distance 560 refers to the shortest distance between the outlet 562 of plumbing 564 and the nearest catalyst 568 in bed 563. In one embodiment, distance 560 is less than about 2 centimeters. In another embodiment, distance 560 is less than about 1 centimeter. In a specific embodiment, distance 560 is less than about 5 millimeters. Distances less than 2 millimeters are suitable in some cases. In a specific embodiment, the burner exhaust exits its delivery plumbing less than about 1 millimeter from the nearest catalyst 568. Other distances may be used as long as heat is generated in the catalyst.

Fan 37 moves the exhaust gases across the catalyst within the fuel cell housing (not shown). In one embodiment, burner exhaust outlet 562 is situated closer to catalyst 568 than fan 37 such that burner exhaust gases do not substantially pre-mix with air. In other words, the burner exhaust outlet 562 is positioned such that the burner exhaust gases travel immediately from outlet 562 onto the catalyst 568 before significantly mixing with any inlet air. As shown, the exhaust outlet 562 is positioned closer to the thermal catalyst 568 than fan 37. For small molecule gas heating mediums such as hydrogen, this reduces the effect of the incoming air as a disturbance to the flow of the heating medium over the catalyst.

After passing across catalyst 568, the burner exhaust is then channeled out of fuel cell 20 in the direction of general airflow and fuel cell exhaust 567. Fuel cell 20 and its one or more exhaust ports 567 may be designed such that the burner exhaust 566 is drawn across additional catalyst before it exits the fuel cell. For example, outlet port 567 is positioned such that a decreasing pressure gradient progresses from the burner exhaust outlet 562, across additional catalyst 568 in catalyst bed 563 in the direction of outlet port 567, and then finally out the fuel cell 20. This increases the interaction between catalyst 568 and heating medium.

Dimensions and configuration of a catalyst containment system can be varied to suit thermal requirements of the fuel cell system and catalyst size, as one of skill in the art will appreciate. In one embodiment, the thickness of the thermal fin system and integrated catalyst containment system does not exceed the width of the bi-polar plate to ensure that adjacent plates do not touch one another and thus avoid shorting out the stack.

Heating a fuel cell with a heating medium may also become undesirable at times. The electrical generation process in fuel cell 20 is commonly exothermic. When the fuel cell continuously generates electrical energy, methanol provision to the fuel cell's thermal catalyst adds to heat generated by the fuel cell and the fuel cell may become too hot. In one embodiment to avoid overheating issues, the present invention places a control valve on a heating medium such as the burner exhaust that controllably routes the heating medium to a) a thermal catalyst and/or fuel cell or b) away from the thermal catalyst and/or fuel cell, as desired.

FIG. 6 shows such a cutoff valve 590 in accordance with one embodiment of the present invention. Valve 590 responds to control signals and routes the burner exhaust 566 away from the catalyst 568 when the fuel cell 20, or a portion thereof such as an MEA layer, surpasses a threshold temperature. In this case, valve 590 re-directs the burner exhaust 568 to an exhaust line 592 for the fuel cell system that outlets the burner exhaust 568 into the environment, via outlet port 594, outside a housing 595 for a package that includes the fuel cell 20 and fuel processor.

When burner exhaust is used as the heating medium, the same burner inlet fuel stream may be used for two purposes: 1) heat generation in the fuel processor, and 2) heat generation for the fuel cell. In one embodiment, the fuel cell system includes controls that allow the amount of fuel provided to the burner to be varied. Controlling the amount of methanol (or other fuel) provided to the burner permits the fuel cell system to run 'rich' or 'lean'.

Figure 7:
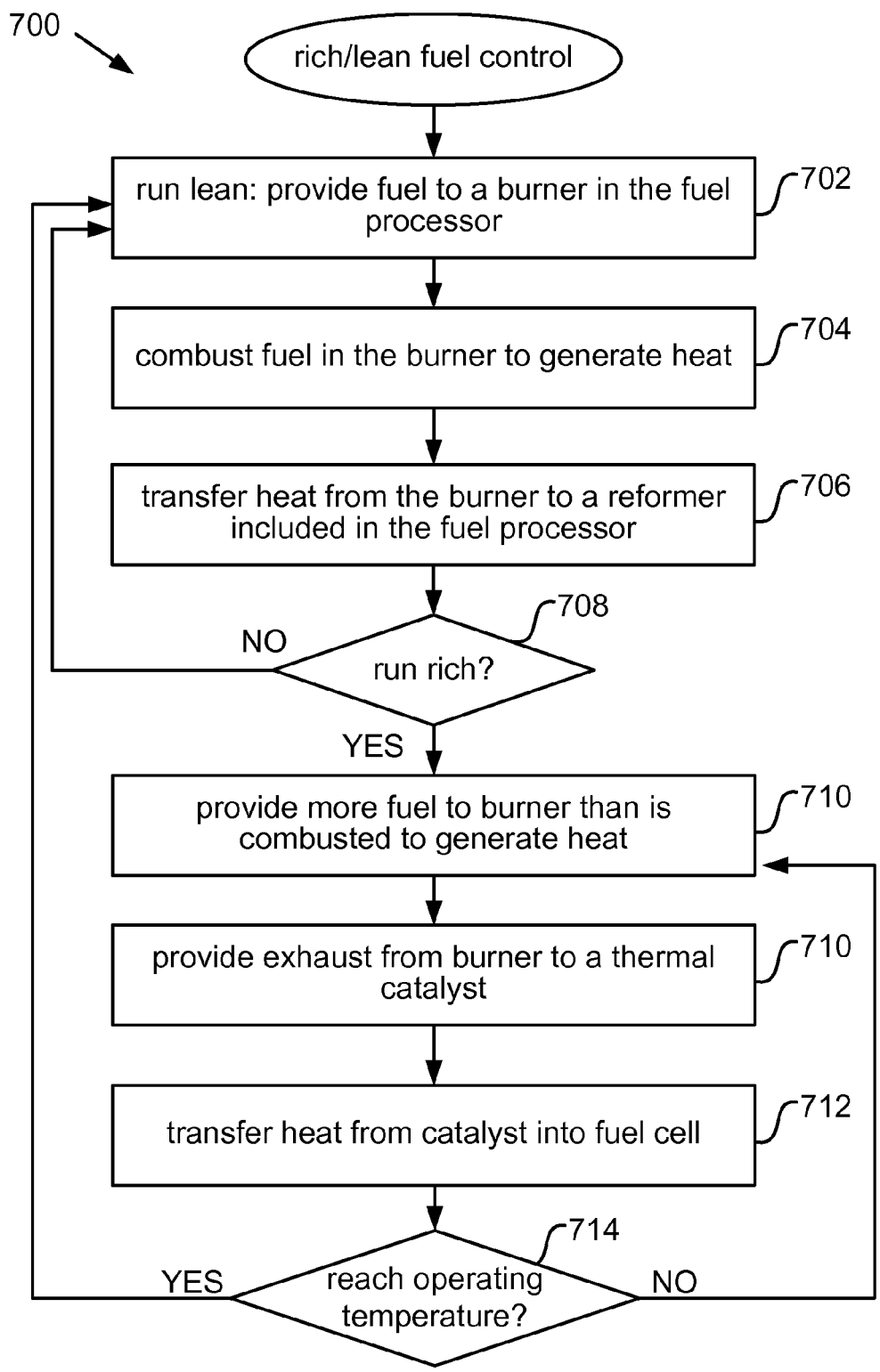
FIG. 7 shows a method for providing fuel in a fuel cell system in accordance with one embodiment of the present invention.

FIG. 7 shows a method 700 for providing fuel in a fuel cell system in accordance with one embodiment of the present invention. In general, method 700 is suitable for use in any fuel cell system that includes a fuel processor and fuel cell that share a burner fuel, and in particular, is well suited for fuel cell systems where thermal efficiency is important.

Method 700 begins by running the fuel 'lean' and providing fuel to a burner in the fuel processor (702). Lean fuel provision provides enough methanol to heat a reformer or fuel processor. Lean methanol provision to a burner feed implies that the amount of methanol currently being supplied is sufficient to maintain a desired degree of heat generation in one or more portions of a fuel processor, or to maintain a desired operating temperature in the reformer. For example, the required amount of methanol provision and heat generation may be determined by the amount of hydrogen currently being generated or a minimum reforming temperature needed by the reforming catalyst. Suitable burners, pumps, valves, plumbing, fuels, and fuel storage cartridges were described above.

The fuel is then catalytically combusted in the burner to generate heat (704). At least a portion of the heat from the burner transfers to a reformer included in the fuel processor (706). Monolithic structures described above transfer the heat via conduction through walls shared by the burner and reformer. Some of the heat may also transfer to a boiler in the fuel processor that vaporizes fuel for the burner, and to a boiler that vaporizes fuel for the reformer. An electrical heater may also be used to vaporize the incoming burner fuel, e.g., during startup before the burner and burner's boiler are hot enough to vaporize the incoming fuel.

A decision is then made to run the inlet burner fuel rich or lean (706). Rich methanol provision provides more methanol to the burner than an amount of methanol that can be consumed according to the amount of catalyst contained in the burner. As a result, the burner exhaust includes unused methanol. When the burner exhaust is provided to a catalyst configured to heat a fuel cell, the rich methanol provision offers methanol in the exhaust that both catalytically heats the fuel cell and fuel processor.

If a decision is made at 706 to heat the fuel cell using the burner exhaust, method 700 increases the amount of fuel provided to the burner—such that more fuel is provided to the burner than is combusted in the burner to generate heat for the fuel processor (708). Plumbing then transports the burner exhaust from the burner to a thermal catalyst that produces heat when the burner exhaust passes over the thermal catalyst (710).

The heat transfers from the thermal catalyst to the fuel cell (712). Suitable catalyst containment systems were described above, but method 700 is not limited by these configurations and may employ other designs for transferring heat from a catalyst into the fuel cell, such as catalyst beds that are internal to the fuel cell and between layers. A heat transfer pipe may also be used to conduct heat from a catalyst that is remote from the fuel cell (see FIG. 8).

The rich methanol provision continues until a threshold temperature for the fuel cell has been reached (714 back to 710). The threshold temperature may correspond to an initial operating temperature of the fuel cell, for example. Once the threshold temperature has been reached, the fuel supply returns to lean provision (702). A pump, or other controlled source of fuel delivery, transports the fuel to the burner and carries out the lean/rich provision. Since the amount of fuel consumed in the burner is known, supplying added fuel using the pump then enables a rich feed. In conjunction with suitable control, such as digital control applied by a processor that implements instructions from stored software, the burner fuel pump responds to control signals from the processor and moves a desired amount of rich or lean methanol from the storage device to the burner. It is important to note that the control in this regard is not necessarily binary (e.g., rich or lean) and may include varying degrees of rich and lean methanol provision. For example, temperature levels, thermal efficiency, and/or fuel efficiency may all affect rich/lean fuel provision levels. A sensor may also be used to read the fuel cell temperature and output feedback to the processor.

Running the methanol provisional rich through the burner eliminates the need for a separate fan or pump that solely services fuel provision to a thermal catalyst in the fuel cell. This simplifies fuel cell system complexity, and reduces overall size of a portable fuel cell system. It also efficiently uses heat that vaporizes the burner fuel to doubly do so for both the fuel processor and fuel cell. Running the methanol across the fuel cell catalyst also functions as an exhaust clean-up by consuming any unused methanol in the (rich or lean) fuel processor exhaust before it exits the fuel cell system into the ambient environment.

Figure 8:
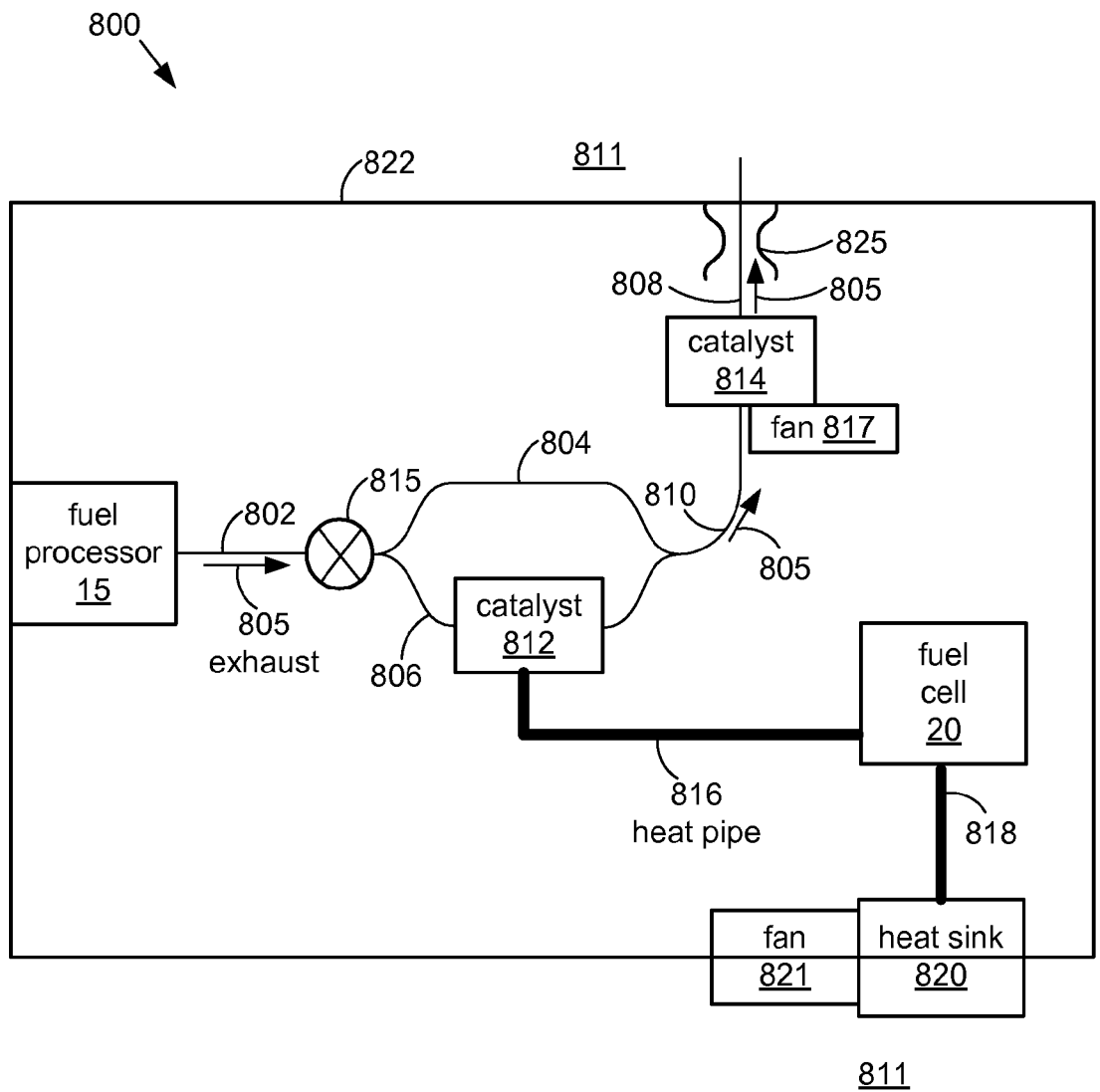
FIG. 8 shows a fuel cell system in accordance with another embodiment of the present invention.

A fuel cell system of the present invention may employ other burner exhaust configurations. FIG. 8 shows a fuel cell system 800 in accordance with another embodiment of the present invention. System 800 includes fuel processor 15, fuel cell 20, fluid lines 802-810, thermal catalyst 812, valve 815, emissions catalyst 814, heat pipe 816, heat pipe 818, heat sink 820 and housing 822.

Valve 815 receives burner exhaust 805 from the burner in fuel processor 15 via line 802 and directs flow of the burner exhaust 805 between line 804 and line 806.

Line 804 communicates the exhaust 805 to emissions catalyst 814, which removes the fuel and unwanted chemicals from exhaust 805 before releasing the exhaust 805 into the environment 811 external to the fuel cell system package or housing 822. Unwanted chemicals removed from exhaust 805 include the fuel (e.g., methanol), products of the combustion in the burner 30, carbon monoxide, formaldehyde, methanol and hydrogen for example. Other exhaust components may also be filtered out, as one of skill in the art will appreciate. Emissions catalyst 814 may comprise any suitable catalyst for removing the unwanted chemicals from exhaust 805.

In one embodiment, catalyst 814 and the methanol in exhaust 805 react to generate heat. In this case, a fan 817 convects the heat away from fuel cell 20 and out of the package 822. A converging/diverging nozzle 825 includes a low negative pressure change that promotes fan flow and exhaust dilution into environment 811. Emissions catalyst 814 is also suitably distant from fuel cell 20 such that the catalytically generated heat does not convect or otherwise transfer to fuel cell 20. Suitable emissions catalyst 814 include platinum or palladium or any of those listed above with respect to burner 30 of FIG. 2A. Other catalysts may be used.

Line 806 communicates exhaust 805 to remote thermal catalyst 812, which generates heat to warm fuel cell 20. In this case, however, heat transfer pipe (or 'heat pipe') 816 separates remote catalyst 812 from fuel cell 20 and conductively transfers heat from catalyst 812 to fuel cell 20. This embodiment transfers heat less efficiently than the system shown in FIG. 5, but also separates fuel cell 20 from the heat-generating thermal catalyst 812 and thermally isolates the two components so that heat from catalyst 812 can be controllably provided to the fuel cell (to avoid overheating the fuel cell). This also simplifies plumbing around fuel cell 20. In a specific embodiment, heat pipe 816 is configured to conductively transfer heat from thermal catalyst 812 to an internal portion of the fuel cell stack. In this case, metal from the heat pipe 816 is brazed of otherwise in conductive thermal communication with internal portions of the fuel cell stack. One or more heat transfer appendages 46 may be used in this regard. In a specific embodiment, catalyst 812 is at least about one centimeter from fuel cell 20. Other distances may be used to thermally isolate the two components.

Valve 815 thus directs burner exhaust 805 to remote catalyst 812 when fuel cell 20 needs heat (e.g., during startup or long periods of inactivity), and diverts the exhaust 805 to emissions catalyst 814 when fuel cell 20 does not need heat.

A second heat pipe 818 conductively removes heat from fuel cell 20. When fuel cell 20 needs cooling, a fan blows air across heat sink 820, which opens to the environment 811 outside package 822. This draws and sinks heat from fuel cell 20. Fan 821 is then controlled as desired, to draw heat and cool fuel cell 20. In another embodiment, fan 821 is not included and heat pipe 818 conducts directly to a vent or radial fins without any active control or heat sink.

Heat pipes 821 and 816 in system 800 include one or more thermal conductors, such as one or more copper (or another metal) structures configured to conductively transfer heat. One of skill in the art is aware of the various techniques to conductively transfer heat between two locations, and the present invention is limited by any specific design to conductively transfer heat.

Together, heating with valve 815 and remote thermal catalyst 812 combine with cooling with fan 821 and heat sink 820 to permit heating and cooling control for fuel cell 20. Suitable control, such as digital control applied by a processor that implements instructions from stored software, then controls valve 815 and fan 821 to regulate fuel cell 20 within a desired temperature range. A temperature sensor may also be included in system 800 to read temperature of fuel cell 20 and output feedback to the processor.

System 800 may also run rich/lean according to method 700 of FIG. 7. When fuel cell 20 needs heat and exhaust 805 runs rich (708), valve 815 diverts the exhaust 805 into remote thermal catalyst 812 (710), and the heat generated using catalyst 812 conducts via heat pipe 816 to fuel cell 20 (712). At this time, fan 821 is off. The exhaust from catalyst 812 continues to emissions catalyst 814 for cleansing any remaining fuel in the exhaust before releasing into environment 811.

Exhaust 805 runs lean (702-706) when fuel cell 20 is exothermically generating heat and does not need heat. Valve 815 then diverts exhaust 805 to emissions catalyst 814 before releasing the exhaust 805 into environment 811. Valve 815 thus avoids overheating fuel cell 20 when too much unburned fuel is in exhaust 805. Also if the fuel cell is above a threshold high temperature, fan 821 turns on and actively cools fuel cell 20.

Figure 9:
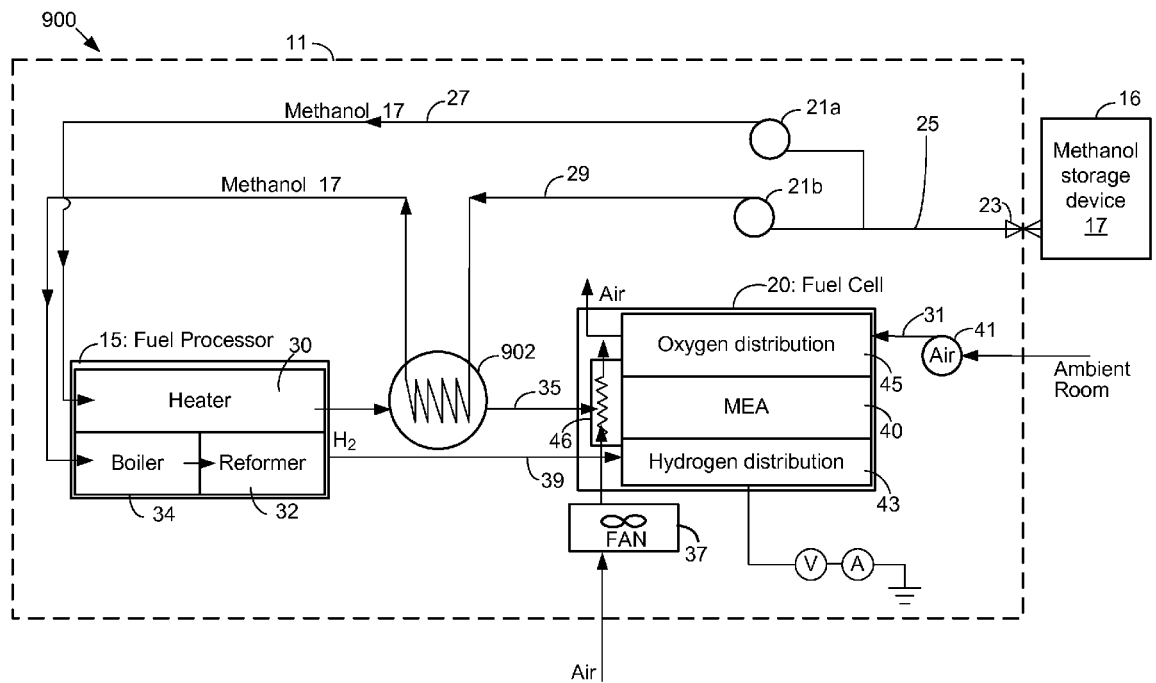
FIG. 9 shows a fuel cell system that includes a recuperator in accordance with one embodiment of the present invention.

The present invention also increases thermal and overall efficiency of a portable fuel cell system by using waste heat in the system to heat incoming fuel. FIG. 9 shows a fuel cell system 900 that includes a recuperator 902 in accordance with one embodiment of the present invention.

Recuperator 902 transfers heat from fuel cell system 900 to the inlet fuel 17 before the methanol reaches fuel processor 15. While system 900 shows recuperator 902 heating methanol in line 29 that carries fuel 17 to the boiler 34 and reformer 32, it is understood that recuperator 902 may be used to heat methanol in line 27 that carries fuel 17 to the burner 30.

Broadly speaking, recuperator 902 may include any device for transferring heat produced in fuel cell system 900 or a heated gas produced in fuel cell system 900 to the incoming fuel 17. Recuperator 902 may include one or more heat transfer channels for moving the incoming fuel 17, moving the heating medium, and one or more surfaces or structures for transferring heat from the heating medium to the incoming fuel 17. In one embodiment, recuperator 902 includes a commercially available heat exchanger. Recuperator 902 may rely on conductive heat transfer, convective heat transfer, and combinations thereof.

In one embodiment, the heat used to warm fuel 17 comes from a fluid in fuel cell system 900. Fluids (a gas or liquid) suitable for use in this manner include: the cathode exhaust from fuel cell 20 in line 33, the reformer 32 exhaust from fuel processor 15 (see FIG. 4), the burner 34 exhaust from fuel processor 15 in line 35, the anode exhaust from fuel cell 20 in line 38, or combinations thereof. Fuel cell 20 and fuel processor 15 both run at elevated temperatures during steady-state operation. Any fluids emitted from fuel cell 20 and fuel processor 15 will also be at elevated temperatures and are suitable for heat transfer to the incoming fuel.

As mentioned before, incoming fuel to a reformer 32 in fuel processor 15 is vaporized before processing by a reforming catalyst in the fuel processor. Similarly, incoming methanol to burner 30 is vaporized before meeting the burner catalyst. The fuel 17 typically enters the fuel cell package at its storage temperature in storage device 16, which is normally cooler than the operating temperatures of fuel cell 20 and fuel processor 15, or fluids emitted from these devices. Any heat transferred to fuel 17 before vaporization in fuel processor 15 reduces the amount of energy that the heater in fuel processor 15 supplies to the fuel 17. This increases efficiency by i) leaving more heat for the reformer and catalytic production of hydrogen and/or ii) consuming less fuel to heat fuel processor 15. This also reduces the burner exhaust temperature leaving the package. For an electrical heater that vaporizes the incoming methanol, this reduces electrical energy used by the electrical heater to vaporize the incoming fuel.

Figure 10A:
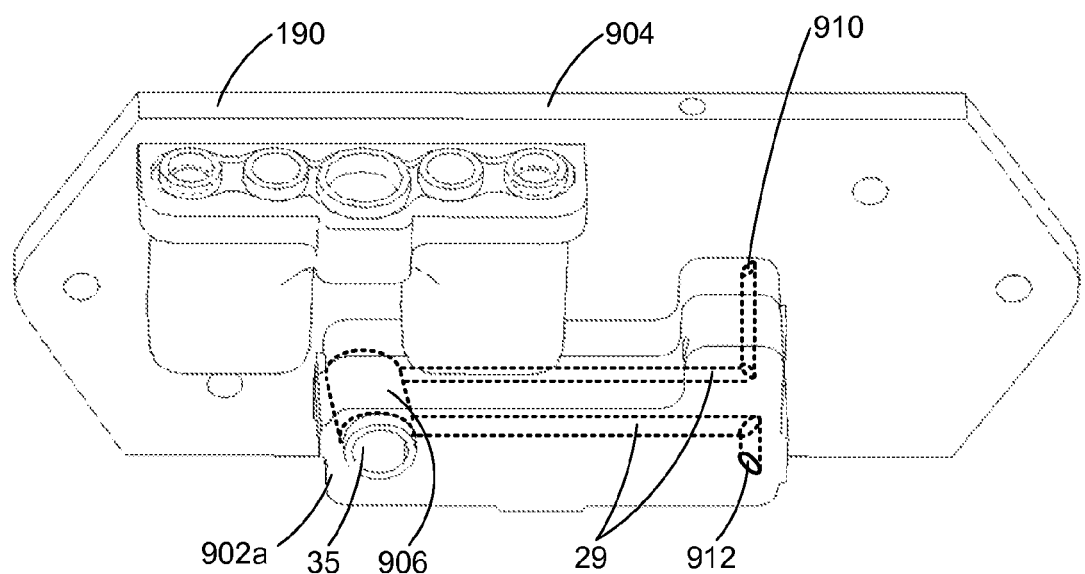
FIGS. 10A-10C show three exemplary recuperators that heat an incoming fuel in accordance with the present invention.
Figure 10B:
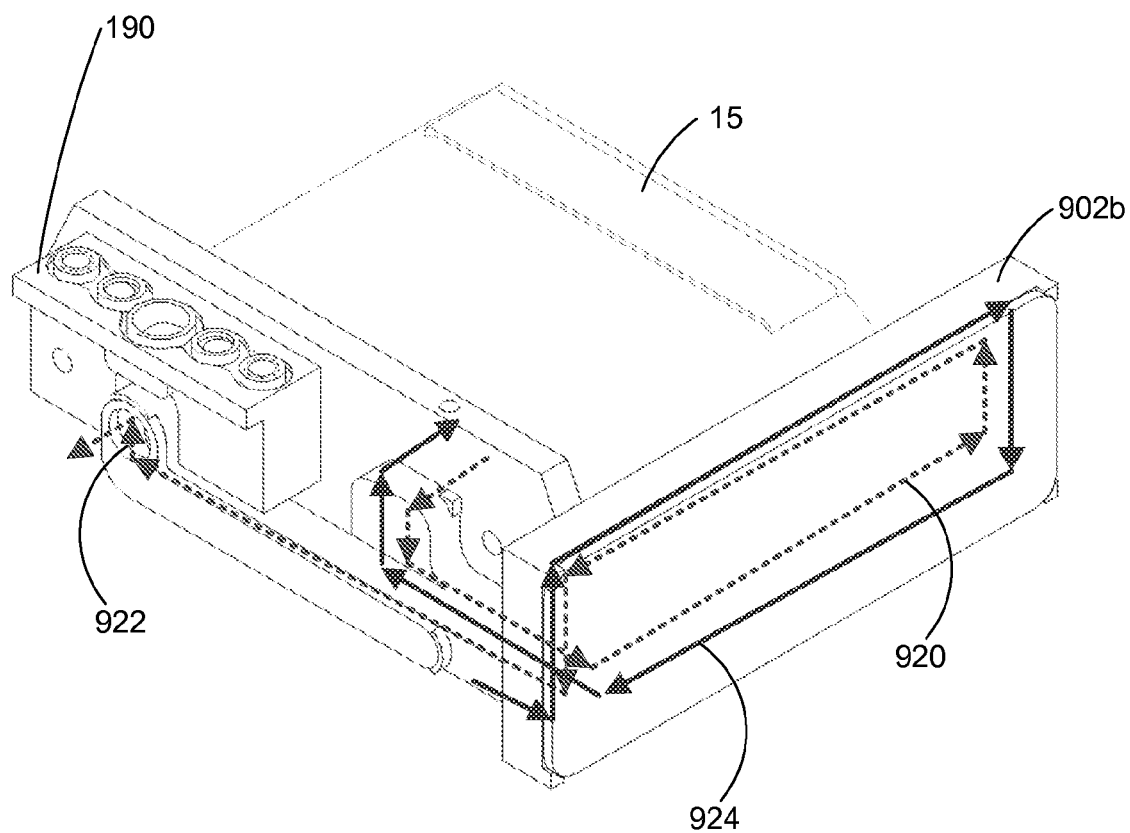
Figure 10C:
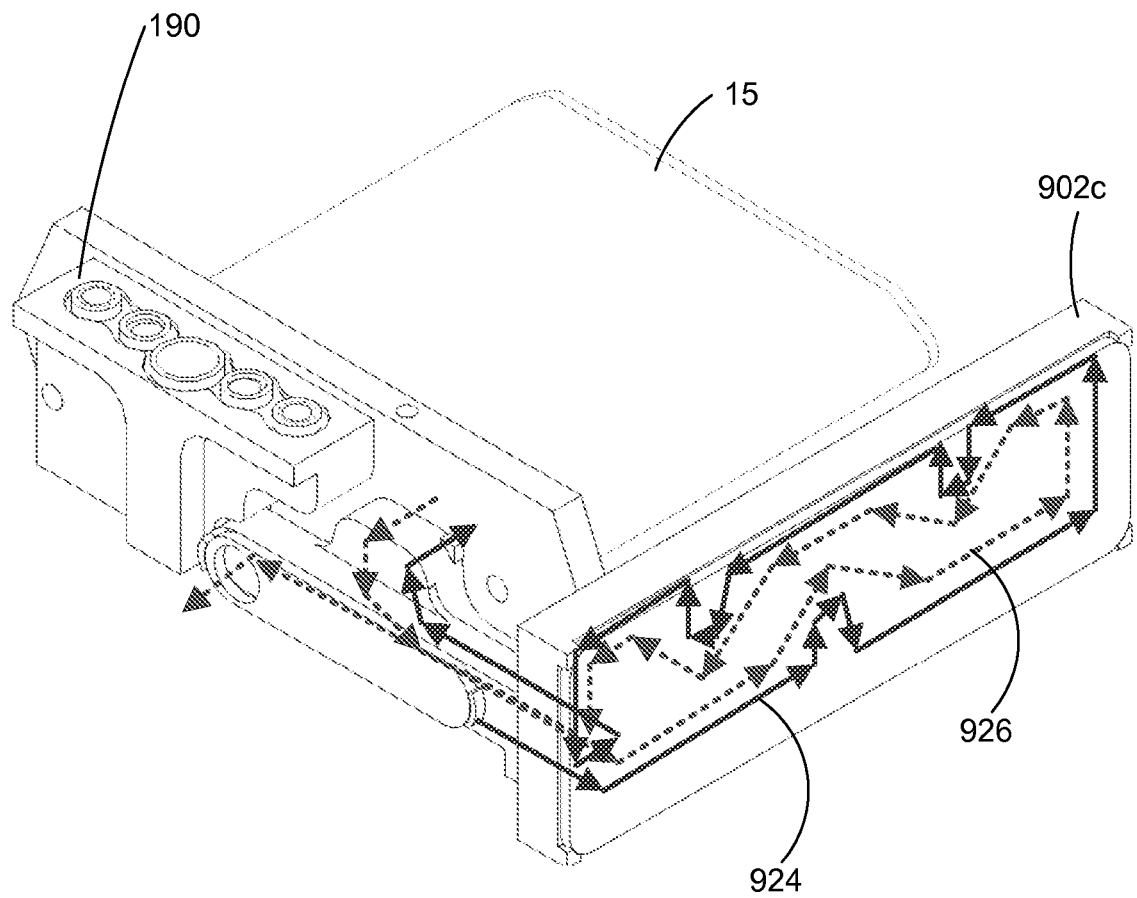

A wide variety of heat exchanging devices are suitable for use herein to transfer heat from the heating medium in system 900 to the incoming fuel. FIGS. 10A-10C show three exemplary recuperators 902a-902c, respectively, in accordance with the present invention.

Recuperator 902a attaches to a wall 904 disposed between fuel cell 20 and fuel processor 15 that faces fuel cell 20. Line 29 carries the fuel from storage device 16 (FIG. 1B) and enters recuperator 902a at hole 912. The fuel then travels through recuperator 902a to a high-surface area portion 906 of line 29 in recuperator 902a. Portion 906 wraps around line 35 and provides a large surface area for thermal interaction with the walls of line 35. As shown in FIG. 1B or 9, line 35 transports the burner exhaust from fuel processor 15 to fuel cell 20. Heat in the burner exhaust thus: a) convects from the burner exhaust to the walls of line 35, conducts through the walls of recuperator 902a to the walls of high-surface area portion 906, and c) convects from the walls of high-surface area portion 906 into the fuel in line 29. The heated fuel then continues through line 29 to hole 910 for further transport to an inlet of the fuel processor.

If the operating temperature of recuperator 902a is less than an adjacent fuel cell or fuel processor, then the recuperator may sinks heat from the warmer structures and reduce efficiency. FIG. 10B shows a recuperator 902b that is physically separated from the fuel processor 15, which reduces heat transfer and loss from the fuel processor 15 to the recuperator 902b. Situating recuperator 902b in a space that is not between fuel cell 20 and fuel processor 15 also permits a larger recuperator 902b.

The larger recuperator 902b also permits longer flow paths for the burner exhaust and inlet fuel, which provides more time for heat transfer. Burner exhaust, shown by dotted line 920 in FIG. 10B, starts at an exit of the burner in fuel processor 15 and linearly runs the length of recuperator 902, twice, before routing back to port 922, which opens to the thermal catalyst used to heat the fuel cell. The inlet fuel path, shown by dotted line 924, starts at a fuel inlet and linearly runs the length of recuperator 902, twice, before provision into the burner inlet (internal and not shown) of fuel processor 15. In this case, gas in burner exhaust 920 runs counterflow to fuel in fuel path 924.

Recuperator 902c (FIG. 10C) is similar recuperator 902b except it non-linear plumbing, in the recuperator, that transports the reformer fuel or the burner fuel. As shown, the plumbing in recuperator 902c follows a curved flow path for both burner exhaust 920 and fuel path 924, which permits longer flow paths for the burner exhaust and inlet fuel and further improves heat transfer from the exhaust to the fuel.

Thermal efficiency of the present invention may also manage heat loss from a fuel cell system package. Many fuel cells and fuel processors operate at elevated temperatures. Burner 30 temperatures from about 200 degrees Celsius to about 800 degrees Celsius are common. Many fuel cells 20 operate at elevated temperatures during electrical energy production. The electrochemical reaction responsible for hydrogen consumption and electrical energy generation typically requires an elevated temperature. Start temperatures in the MEA layer 62 and its constituent parts greater than 150 degrees Celsius are common.

The ambient environment around the fuel cell package is cooler, and typically less than 40 degrees Celsius. Heat loss from a fuel cell or fuel processor to the ambient environment decreases efficiency of each device, and of the fuel cell system.

In one embodiment, a fuel cell package of the present invention includes an insulation arrangement that reduces heat loss from a fuel cell or a fuel processor. The insulation arrangement includes one or more layers of insulation that are disposed at least partially between a fuel cell and/or fuel processor and a package housing. The insulation arrangement reduces heat transfer from the fuel cell and/or fuel processor to the package housing, which reduces temperatures for the housing. This in turn reduces heat loss to the ambient environment. Thus, the insulation arrangement keeps heat in the portable package and increases efficiency for the system components running at elevated temperatures.

Figure 11:
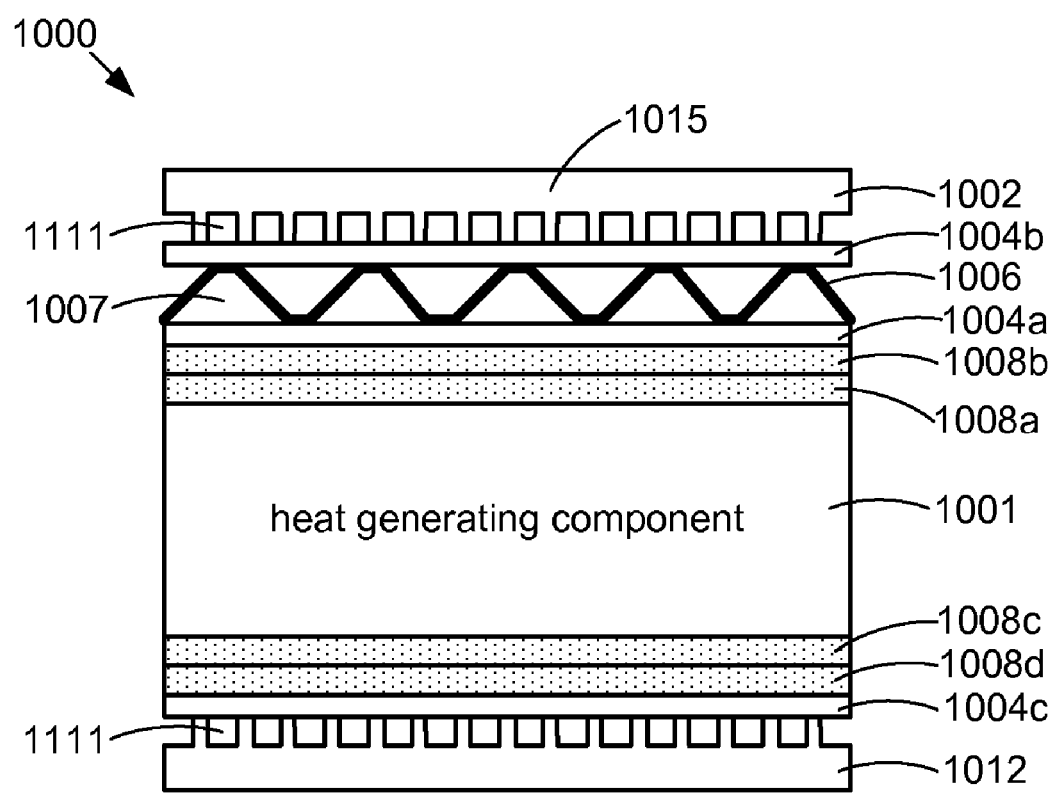
FIG. 11 shows a simplified cross section of a fuel cell system in accordance with a specific embodiment of the present invention.

FIG. 11 shows a simplified cross section of a fuel cell system that includes an insulation arrangement 1000 in accordance with a specific embodiment of the present invention. The fuel cell system includes a heat-generating component 1001, such as a fuel cell or fuel processor that generates heat.

Above the heat-generating component 1001, arrangement 1000 includes (in order of outward layering in cross section): a first layer of insulation 1008a, a second layer of insulation 1008b, a non-conductive membrane layer 1004a, spacing structure 1006, a second non-conductive membrane layer 1004b, and top package wall 1002.

Below the heat-generating component 1001, arrangement 1000 includes: a first layer of bottom insulation 1008c, a second layer of insulation 1008d, a non-conductive membrane layer 1004c, and bottom package wall 1012.

Insulation layers 1008a-d is disposed at least partially around the outside of component 1001 to minimize heat loss therefrom. Insulation 1008 may include one or more layers of a low thermal conductance material. In a specific embodiment, insulation 1008 wraps around the fuel cell 20, fuel processor 15 and/or fuel cell system package. Thickness for the insulation 1008 layer and the number of wrappings around each heat-generating component 1001 may be varied according to design. Increasing the thickness or the number of wrappings decreases heat loss but increases package thickness and is varied according to design. A thickness for insulation 1008 from about 1 millimeter to about 10 millimeters is suitable for some designs. In another specific embodiment, insulation 1008 has a thickness of about 2 millimeters and is wrapped twice about the fuel cell and fuel processor. Insulation 1008 may include a commercially available sheet of insulation. One suitable commercially available insulation material comprises aerogel insulation as provided by Aspen Systems, Inc. of Marlborough, Mass. Other forms of insulation may be used. One of skill in the art will appreciate the wide variety of commercially available insulation products useful herein to achieve a desired temperature drop.

Spacing structure 1006 includes a porous cross section with air gaps 1007. The gaps 1007 may be configured as channels (e.g., normal to the page) that permit airflow 4therethrough. In one embodiment, a fan moves air through the gaps 1007 to facilitate heat dissipation away from surface 1015.

Each non-conductive membrane layer 1004a-c includes a thin rigid sheet with low thermal conductivity. The low thermal conductivity of membrane layer 1004 reduces heat transfer out of the package. The rigidity of membrane layer 1004 prevents the compliant insulation layer 1008b from extruding into spacing structure 1006 and reducing the size of air gaps 1007. In a specific embodiment, each non-conductive membrane layer 1004 includes a thin layer of mica paper, e.g., about 0.5 millimeters thick. Other materials and thicknesses are suitable for use.

Top package wall 1002 and bottom package wall 1012 represent the outside walls of a portable package the contains the fuel cell system. As shown, the inner surfaces of top and bottom walls 1002 and 1012 include a porous, ribbed, baffled or pinned structure that also creates air channels 1111. Similar to gaps 1007, channels 1111 may be configured as channels that permit airflow therethrough. In one embodiment, a fan moves air through the gaps 1111 to facilitate heat dissipation away from surface 1015. This can be the same fan that moves air through gaps 1007.

Arrangement 1000 thus includes a number of insulation layers and layer types that can be varied according to design. For example, the cross section above and below the heat-generating component 1001 provides two examples of insulation arrangement 1000 between component 1001 and outer surface 1015. In another embodiment, gaps 1007 may be disposed solely between insulation 1008 and package wall, between insulation 1008 and component 1001, etc. In one embodiment, layers and layer types in insulation arrangement 1000 are selected and configured such that the outside surface 1015 of a fuel cell package maintains a desired temperature. Standards imposed on consumer-electronics devices may mandate surface temperature of electronics devices such as a tethered fuel cell package to be less than some predetermined level, and insulation arrangement 1000 may be designed to regularly meet this level. Some consumer-electronics device standards require a surface temperature less than 50° C. In another specific embodiment, an insulation layer 1008 is disposed around component 1001 in addition to a layer of insulation 1008 around the fuel cell system package 1015. This dual insulation set further maintains heat in the heat generating components of the fuel cell system.

While this invention has been described in terms of several preferred embodiments, there are alterations, permutations, and equivalents that fall within the scope of this invention which have been omitted for brevity's sake. For example, although the present invention has described fuel processors in a portable fuel cell systems, it is not related to small or portable systems. In addition, heating systems have been described with respect to fuel cells that include heat transfer appendages. It is understood that the present invention need not include one or more heat transfer appendages. It is therefore intended that the scope of the invention should be determined with reference to the appended claims.

What is claimed is:

1. A portable fuel cell system for producing electrical energy, the portable fuel cell system comprising:
   a fuel processor that includes
      a reformer configured to receive reformer fuel and including a catalyst that facilitates the production of hydrogen from the reformer fuel, and
      a burner configured to i) catalytically process burner fuel to generate heat and ii) output burner exhaust;
   a fuel cell including
      a fuel cell stack configured to produce electrical energy using hydrogen output by the fuel processor,
      a set of bi-polar plates included in the fuel cell stack, wherein each bi-polar plate includes a thickness that is less than about 2 millimeters, and
      a set of heat transfer appendages, wherein each heat transfer appendage includes a portion arranged external to the fuel cell stack and is in conductive thermal communication with a bi-polar plate in the set of bi-polar plates;
   a thermal catalyst, disposed outside the fuel cell and in conductive thermal communication with the set of heat transfer appendages, operable to produce heat when the burner exhaust interacts with the thermal catalyst; and
   plumbing configured to controllably transport the burner exhaust to the thermal catalyst, wherein the plumbing includes a valve that directs the burner exhaust a) to the thermal catalyst or b) to a line that transports the burner exhaust away from the thermal catalyst, and wherein an outlet of the plumbing is less than about 2 centimeters from the thermal catalyst nearest to the outlet.

2. The fuel cell system of claim 1 wherein the thermal catalyst is included in a catalyst containment system that includes a set of walls configured to hold the thermal catalyst outside the fuel cell and permit the heating medium to pass into the catalyst containment system.

3. The fuel cell system of claim 2 wherein the heat transfer appendage forms one of the set of walls.

4. The fuel cell system of claim 2 further comprising an end wall on the distal end the heat transfer appendage that extends normal to the appendage and above and below the appendage.

5. The fuel cell system of claim 1 wherein the line that transports the burner exhaust is configured to transport the burner exhaust to an emissions catalyst that is configured to remove the fuel from the burner exhaust before the burner exhaust exits a housing for the fuel cell system.

6. The fuel cell system of claim 5 wherein the burner exhaust includes methanol.

7. The fuel cell system of claim 1 further comprising a heat transfer pipe configured to conductively transfer heat from the thermal catalyst to the fuel cell stack.

8. The fuel cell system of claim 7 wherein the heat transfer pipe is configured to conductively transfer heat from the thermal catalyst to an internal portion of the fuel cell stack.

9. The fuel cell system of claim 1 further comprising:
a heat sink in conductive thermal communication with the fuel cell using a heat transfer pipe configured to conductively transfer heat from the fuel cell to the heat sink; and
a cooling fan configured to cool the heat sink.

10. A portable fuel cell system for producing electrical energy, the portable fuel cell system comprising:
a fuel processor that includes
a reformer configured to receive reformer fuel and including a catalyst that facilitates the production of hydrogen from the reformer fuel, and
a burner configured to catalytically process burner fuel to generate heat;
a fuel cell including
a fuel cell stack configured to produce electrical energy using hydrogen output by the fuel processor,
a set of bi-polar plates included in the fuel cell stack, wherein each bi-polar plate includes a thickness that is less than about 2 millimeters, and
a set of heat transfer appendages, wherein each heat transfer appendage includes a portion arranged external to the fuel cell stack and is in conductive thermal communication with a bi-polar plate in the set of bi-polar plates;
a catalyst containment system that includes a set of walls configured to hold a thermal catalyst outside the fuel cell and permit a heating medium to pass into the catalyst containment system, wherein the thermal catalyst and heating medium are selected to produce heat when the heating medium interacts with the thermal catalyst; and
plumbing configured to transport the heating medium to the catalyst containment system, wherein an outlet of the plumbing is less than about 2 centimeters from thermal catalyst nearest to the outlet.

11. The fuel cell system of claim 10 wherein the plumbing is configured to release the heating medium within the walls of the containment system.

12. The fuel cell system of claim 10 wherein an outlet of the plumbing is less than about 1 centimeter from the thermal catalyst nearest to the outlet.

13. The fuel cell system of claim 12 wherein an outlet of the plumbing is less than about 2 millimeters from the thermal catalyst nearest to the outlet.

14. The fuel cell system of claim 10 wherein the heating medium includes exhaust from the burner and the plumbing is configured to transport the burner exhaust from the burner to the catalyst containment system.

15. The fuel cell system of claim 14 wherein the burner exhaust includes unused methanol.

16. The fuel cell system of claim 10 further comprising a heat transfer pipe configured to conductively transfer heat from the catalyst containment system to the fuel cell stack.

17. The fuel cell system of claim 16 wherein the heat transfer pipe is configured to conductively transfer heat from the thermal catalyst to an internal portion of the fuel cell stack.

18. The fuel cell system of claim 10 wherein the heat transfer appendage forms one of the set of walls of the catalyst containment system.

19. The fuel cell system of claim 18 wherein the plumbing includes a valve that directs the burner exhaust a) to the thermal catalyst or b) to a line that transports the burner exhaust away from the thermal catalyst.

20. The fuel cell system of claim 19 wherein the line transports the burner exhaust outside a housing wall for a portable package that contains the fuel cell system.

* * * * *